(12) United States Patent
Saik

(10) Patent No.: US 7,240,681 B2
(45) Date of Patent: Jul. 10, 2007

(54) TRAILER MOUNTED MOBILE APPARATUS FOR DEWATERING AND RECOVERING FORMATION SAND

(76) Inventor: Larry Saik, P.O. Box 99, Innisfree, Alberta (CA) T0B-2G0

( * ) Notice: Subject to any disclaimer, the term of this patent is extended or adjusted under 35 U.S.C. 154(b) by 621 days.

(21) Appl. No.: 10/694,716

(22) Filed: Oct. 29, 2003

(65) Prior Publication Data

US 2004/0112822 A1    Jun. 17, 2004

Related U.S. Application Data

(60) Provisional application No. 60/423,856, filed on Nov. 6, 2002.

(51) Int. Cl.
*B08B 3/01* (2006.01)

(52) U.S. Cl. ............... 134/169 R; 134/167 R; 134/177

(58) Field of Classification Search ............ 134/166 R, 134/169 R, 167 R, 168 R, 172, 177
See application file for complete search history.

(56) References Cited

U.S. PATENT DOCUMENTS

| | | | | |
|---|---|---|---|---|
| 1,951,649 A * | 3/1934 | Delano | ...................... | 134/57 R |
| 2,081,339 A * | 5/1937 | Rue et al. | .................... | 422/291 |
| 2,240,227 A * | 4/1941 | Saussure | ................. | 134/168 R |
| 3,095,001 A * | 6/1963 | Steltz | ...................... | 134/167 R |
| 3,120,237 A * | 2/1964 | Lang | ....................... | 134/102.1 |
| 3,121,536 A * | 2/1964 | McKibben | ................... | 239/253 |
| 3,407,824 A * | 10/1968 | Ray | .......................... | 134/56 R |
| 3,746,023 A * | 7/1973 | Smith | ..................... | 134/22.18 |
| 4,828,625 A * | 5/1989 | Moran | ..................... | 134/22.18 |
| 4,945,933 A * | 8/1990 | Krajicek et al. | ......... | 134/167 R |
| 5,421,903 A * | 6/1995 | Manabe et al. | ............ | 134/22.1 |
| 5,470,458 A * | 11/1995 | Ripley et al. | ............... | 208/370 |
| 5,582,652 A * | 12/1996 | Robertson et al. | ....... | 134/22.12 |
| 5,664,992 A * | 9/1997 | Williams, Jr. | ................ | 451/76 |
| 6,021,787 A * | 2/2000 | Luke | .......................... | 134/22.1 |
| 6,069,002 A * | 5/2000 | Powell, Jr. | .................. | 435/264 |
| 6,142,160 A * | 11/2000 | Winslow et al. | ........... | 134/22.1 |
| 6,539,962 B2 * | 4/2003 | Paper et al. | ............ | 134/169 R |
| 2003/0102018 A1 * | 6/2003 | Ostermeier | ................. | 134/114 |

* cited by examiner

*Primary Examiner*—Frankie L. Stinson
(74) *Attorney, Agent, or Firm*—J. Gordon Thomson

(57) ABSTRACT

An apparatus for removing formation sand from an oil storage tank. The apparatus is mounted to a truck towable trailer so that it may be transported to remote sites. Mounted to the truck towable trailer is a container adapted to accept and dewater a sand-water slurry pumped from the oil storage tank. The slurry is formed by injecting high pressure water from a water reservoir mounted to the truck towable trailer into the approximate centre of mass of the formation sand by way of a pipe having a nozzle generating a spherical spray pattern within the slurry. The pipe is forced into the slurry by way of a two counter-rotating drive wheels in frictional contact with the pipe. Included in the apparatus is a bifurcated conduit adapted for attachment to the storage tank drain port adapted for the injection of high pressure through one branch of the conduit and withdrawal of slurry from the other branch and into the container by way of a slurry pump. The dewatering of the slurry takes place by a plurality of screen filters mounted to the bottom, side and front inside walls of the container. Oil and water extracted from the slurry is recycled back into the storage tank for later removal and treatment. All pumps and conduits are mounted to the truck towable trailer so that the apparatus is self-contained.

13 Claims, 17 Drawing Sheets

TRAILER MOUNTED MOBILE APPARATUS FOR DEWATERING AND RECOVERING FORMATION SAND

CROSS-REFERENCE TO RELATED APPLICATIONS

This application is entitled to the benefit of my Provisional Patent Application 60/423,856 filed on Nov. 6, 2002.

REFERENCE TO MICROFICHE APPENDIX

Not applicable.

FIELD OF THE INVENTION

This invention pertains to processes and apparatus for liquid purification or separation by physical separation and more particularly a trailer mounted mobile apparatus for dewatering and recovering formation sand contained in a remotely located field storage tank.

BACKGROUND OF THE INVENTION

It is well known in the oil and gas extraction industry that well stimulus by the injection of fluid suspended sands at high pressures down a drill hole results in improved hydrocarbon production. This process is commonly known as "frac-ing" and the sand used is called a proppant or "frac sand". Silica is most often used as a frac sand because of physical and chemical properties that resists crushing and chemical attack. The amount of sand proppant used in a typical deep well frac-ing operation ranges from 30,000 lbs to 50,000 lbs. In specific well fields the amount of frac sand used in a single day may reach 1.5 million pounds. Therefore, frac sand management techniques are becoming increasingly important in hydrocarbon recovery operations because proppant represents a significant industrial waste stream. When these materials are transported back to facilities with crude oil from the wells, the beads settle out, along with formation sand, to form a semi-solid sludge in the bottoms of vessels. This proppant/frac sand often goes into lined landfills creating a significant storage and pollution problem. Separating the proppant from the oil or oil-waste has a number of advantages including recovery of a reusable product, reduction of waste storage costs and mitigation of toxic waste pollution. Major hydrocarbon producers are under increasing public and regulatory pressure to conduct their businesses in a manner that is as environmentally benign as possible. This has created a problem that was heretofore addressed by burying the mixtures. Since, burying or long-term storage is not longer a feasible solution, there has been created an imperative to resolve this issue.

This problem was partially solved by my invention entitled "Treatment of Oil, Water and Sand Mixtures" described in my Canadian Patent Pending 2,196,522. This invention describes a method and apparatus for treating oil, water and sand mixtures to separate components. However, this invention was designed to be stationary. Due to the remote nature of many oil and gas well fields, trucking oil, water and sand mixtures to a separation plant is prohibitively expensive.

Attempts have been made to design mobile systems for separate components of oil, water and sand mixtures. For example, U.S. Pat. No. 4,929,353 entitled "Portable Liquid-Solid Separator for Bulk Sludge" issued to Harris on May 29, 1990 and U.S. Pat. No. 6,110,383 entitled "Oil/Water Separator" issued to Coombs et al on Aug. 29, 2000 tries to resolve the problem of separating liquids from solids. However, these inventions do not provide means to separate a three-component system of oil, water and sand into cleansed and recyclable constituent parts. Furthermore, these inventions do not address the need to interface the separators with storage vessels holding the mixtures. As well, these inventions are not self-contained and rely upon external sources of water that may not be available at remote storage sites.

Therefore, there continues to be a need, not heretofore known in the prior art, of a self-contained mobile system for dewatering formation sand from hydrocarbon production stored a distant and remote locations.

SUMMARY OF THE INVENTION

My invention comprises a trailer mounted mobile apparatus for dewatering and recovering formation sand from a sand-water-oil mixture contained in a remotely located field oil storage tank. The tank has a flanged fluid drain hole located at the bottom and a flanged fluid inlet port located above the fluid drain hole. The trailer mounted mobile apparatus is towable by a truck.

To connect the apparatus to the field tank my invention includes a furcated conduit adapted for connecting to the tank flanged fluid drain hole. The furcated conduit has a first branch and a second branch. The first branch has a flanged first end and a flanged second end. The second branch has a first end connected to the first branch and a second branch flanged second end. The axis of the second branch is angled away from the axis of the first branch forming an inter-axial angle of less than ninety degrees. The flanged first end of the first branch is connected to the tank flanged fluid drain hole. The first and second branches have a diameter equal to the diameter of the tank flanged fluid drain hole.

In order to remove the sand from the slurry, my invention requires the creation of a water-sand slurry within the tank so that the slurry may be pumped out of the tank. Some oil will also be mixed into the slurry and this limited amount of oil is recycled back into the field storage tank with the separated water. Once the sand is removed from the tank, the separated water is returned to the tank. The oil and water in the tank will separate into different levels within the tank and this permits the oil and water to be removed separately for further processing. To create the slurry, my invention includes high pressure water injection means for injecting high pressure water into the formation sand within the tank. The high pressure water is injected into the tank through the first branch of the furcated conduit. The slurry is withdrawn from the tank by way of the second branch of the furcated conduit. The slurry is then transported to a dewatering means located remote from the oil storage tank.

To inject high pressure water into the tank through the first branch of the conduit there is a pipe having a pipe first end and a pipe second end. The length of the pipe is adequate to transverse the length of the furcated conduit plus the radius of the tank so that said pipe first end is proximate to the vertical axis of the tank. The pipe second end extends from the first branch flanged second end. By inserting the pipe into the first branch flanged second end an annulus is created. The annulus is sufficiently dimensioned to permit an adequate flow of sand-water slurry from the tank and into the second branch of the furcated conduit. The annulus at the first branch flanged second end is sealed by suitable sealing means to prevent leakage of sand-water slurry. The pipe includes a nozzle attached to its first end. The nozzle is perforated to create a spherical spray pattern of high pressure water within the formation sand to create the sand-water slurry without causing the oil stored within the tank to substantially mix with the sand-water slurry. A source of high pressure water for injection into the formation sand is connected to the pipe second end.

The source of high pressure water for injection into the formation sand comprises a reservoir of water and a first pump having a suction intake that is connected to the reservoir of water by an intake conduit. The pump has a discharge connected to a discharge conduit that connects to the pipe second end. The pump is sufficiently sized to create a discharge pressure and flow adequate to cause mixture of the sand and water within the tank to form the slurry. A control valve is mounted on the discharge conduit to control fluid flow into the pipe second end. The reservoir and the first pump are mounted on the mobile trailer. The reservoir has a volume of approximately 2.27 cubic meters of water.

In order to force the pipe into the compacted formation sand at the bottom of the tank, my invention further includes means for forcibly inserting the pipe into the formation sand. The forcing means includes a rectangular frame removeably mounted to the second flanged end of the first branch of the furcated conduit. The rectangular frame comprises a first channel-shaped half-frame having a first back member, a first side member and a second side member, and a second channel-shaped half-frame having a first back member, a first side member and a second side member. The first and second half-frames are identically sized. The second channel-shaped-half frame is positioned opposite the first channel-shaped half frame so that their respective open ends face each other. The second channel-shaped half-frame is positioned partially within the first channel-shaped half-frame in a sliding alignment so that the first side member of the first channel-shaped half frame is adjacent to and parallel to the second side member of the second channel-shaped half frame and wherein the second side member of the first channel-shaped half frame is adjacent and parallel to the first side member of the second channel-shaped half frame. A first protruding member is fixed to the outside surface of the second side member of the second half-frame. The first protruding member is perpendicular to the second side member of the second half-frame and includes a first threaded aperture having an axis parallel to the second side member of the second-half frame. When extended, the axis intersects the first back member of the first half-frame at a point adjacent to the intersection of the first half-frame first back member and first side member. A similar second protruding member is fixed to the outside surface of the second side member of the first-half frame. A threaded aperture is located where the axes of the threaded apertures within the protruding members intersect the back members. A first and second threaded rods having a length at least equal to the length of the first half-frame first side member is threaded into the co-axial apertures. When the rods are turned in a clock-wise direction they have the effect of moving the half-frames towards each other. Handles are included to assist in turning the rods.

To each of the half-frames is mounted a single drive wheel on an axle. The axle is positionally fixed within each half-frame and moveable with each half-frame. In this way, when the two-half frames are drawn towards each other, the drive wheels are caused to frictionally engage the pipe. A plurality of drive gears, a drive chain and a hydraulic motor drive the wheels forwards or backwards and hence drive the pipe into or out of the tank.

The slurry is drawn out of the tank through the annulus within the first branch of the furcated conduit and into the second branch of the furcated conduit. The slurry is discharged from the end of the second branch into a screen chamber adapted to trap debris within the slurry that is not suited for pumping. From the screen chamber the slurry is drawn into a pump housing containing a water-driven suction pump. From there, the slurry is discharged into a reduction nozzle adapted to accelerate the flow of slurry into an adjacent reduction nozzle discharge conduit attached to the discharge end of the reduction nozzle.

Additional low pressure water is added to the tank so that the slurry maintains adequate water content for pumping. Low pressure water is pumped from a reservoir to the inlet hole of the tank. A control valve is used to control the flow of low pressure water.

When the slurry is discharged from the reduction nozzle it enters the intake conduit of a pump designed to pump slurry. The slurry pump transports the slurry to the slurry dewatering means.

The slurry dewatering means comprises a trailer mounted rectangular container having a volume sufficient to contain the slurry pumped from the field storage tank. The container has a rear gate having a first closed position for receiving slurry and a second open position for discharging dewatered formation sand.

An operator is positioned on a platform fixed to the side of the container in order to monitor the slurry in the tank. Oil that is mixed with the water and sand slurry will float to the top of the container. The operator manipulates a skimmer comprising a buoyant suction hose with a flattened suction nozzle fixed to the end. The hose will float on the oil/water interface and is directable by the operator. The operator use the buoyant hose to skim the oil off of the top of the water contained in the container. The discharge end of the buoyant suction hose is connected to the suction intake of a low pressure pump and the oil skimmed from the container is discharge back into the oil storage tank. The re-introduced oil will float to the surface of the oil/water interface within the oil storage tank.

The bottom surface, side walls and front wall of the container are covered with filtering screens. Once the slurry is pumped into the container, gravity and hydrostatic pressure within the slurry will force the water to the sides and bottom of the container. The filter screens located on the sides and bottom of the container separate the water from the formation sand. The water travels down to a sump where it is collected and transported to the water reservoir for recycling into the tank as required to maintain the slurry consistency and slurry removal process. Once the water is removed from the sand, the container may be tilted upwards so that the sand may be discharged from the opened gate.

Still further objects and advantages of the invention will become apparent from a consideration of the ensuring description and drawings.

BRIEF DESCRIPTION OF THE DRAWINGS

The invention will be more readily understood by reference to the following description, taken with the accompanying drawings, in which.

DETAILED DESCRIPTION OF THE INVENTION

My invention solves a long standing problem in the oil and gas recovery industry relating to the fast and inexpensive recovery of sand from oil storage field tanks and dewatering the same sand prior to disposal or recycling. In the dewatering process by-products are recovered that can be recycled and sold. My invention provides a mobile and self-contained system for the cost-effective recovery of formation sand from oil storage field tanks and the dewatering of the same. The water contained in the oil storage tank is recycled into the tank for subsequent recovery and further treatment. Any oil that is removed with the slurry is also recycled back into the oil storage tank for recovery and further processing. In this manner, the need for lined pits to dispose of hydrocarbon contaminated slurry and formation sand is eliminated.

Figure 1:
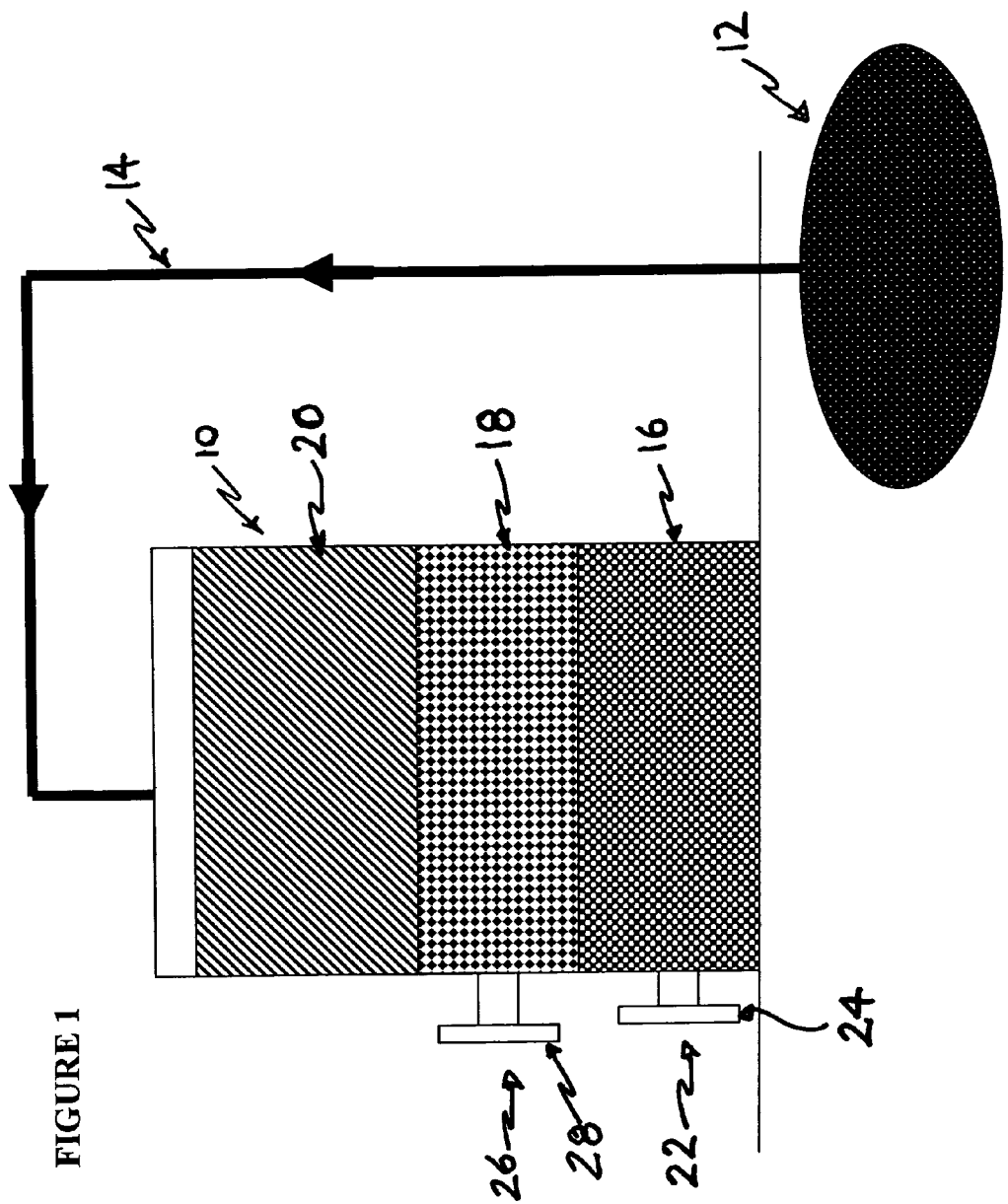
FIG. 1 is a sectional side view of a typical remote field storage tank showing the layers of formation sand, water and oil within the remote field storage tank.

FIG. 1 illustrates a typical remote field storage tank (10) found in a typical oil and gas field. A water-oil-sand mixture is pumped from the formation (12) through a conduit (14) into tank (10) for storage. After a certain period of time the water-oil-sand mixture will separate. Formation and frac sands (16) will settle to the bottom of the tank. Water will separate into a layer (18) between the oil and the sand. The oil (20) will float on top of the water layer. The tank is generally equipped with a flanged fluid drain hole (22) having flange (24) and flanged port (26) having flange (28). The most effective manner to remove the water and sand from the remote oil storage tank is to remix the sand with the water and create a slurry that can be drawn out of the bottom of the tank.

Figure 2:
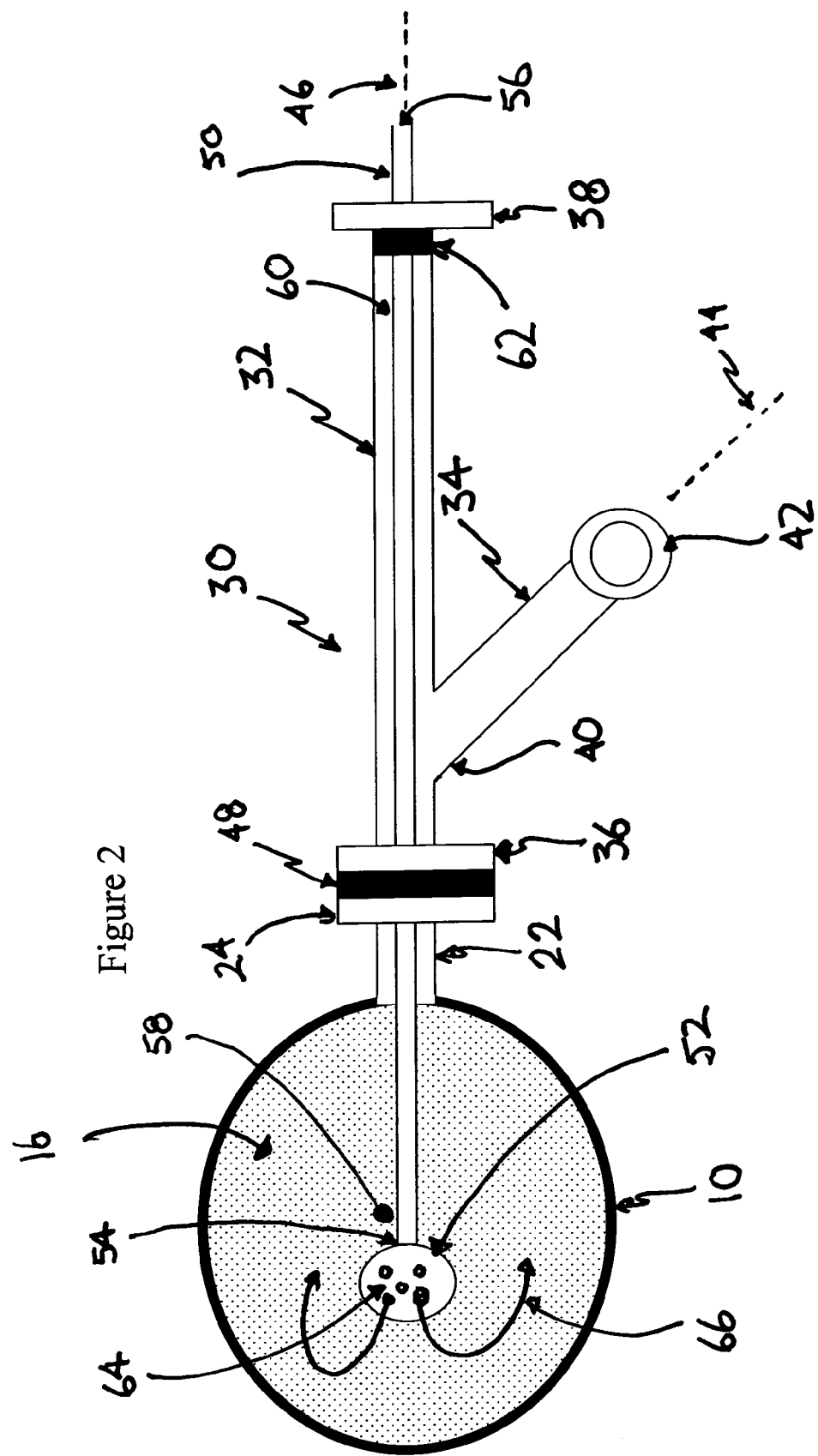
FIG. 2 is a sectional top view of the furcated conduit and high pressure injection means of my invention used to create a slurry within the remote field storage tank.

Referring to FIG. 2 there is shown furcated conduit (30) adapted for connection to tank (10) flanged fluid drain hole (22). The furcated conduit (30) has a first branch (32) and a second branch (34). The first branch having a flanged first end (36) and a flanged second end (38). The second branch (34) has a first end (40) connected to the first branch and a second branch flanged second end (42). The axis (44) of the second branch (34) is angled away from the axis (46) of the first branch (32) forming an inter-axial angle of less than ninety degrees. The flanged first end (36) of the first branch (32) is connected by flange (36) and flange (24) to the tank flanged fluid drain hole (22). A seal (48) is inserted between flanges (36) and (24) to ensure a leak free operation. The first and second branches have a diameter equal to the diameter of the tank flanged fluid drain hole.

Also shown in FIG. 2 is high pressure water injection pipe (50) and spray nozzle (52) for injecting high pressure water into the formation sand (16) within the tank (10) through the first branch (32) of the furcated conduit in order to create a sand-water slurry within the tank while maintaining the oil contained within the tank substantially undisturbed.

The slurry is withdrawn from the tank by way of the second branch of the furcated conduit and then transported by transportation means to slurry dewatering means located remote from the tank.

Still referring to FIG. 2, the high pressure water injection means for injecting high pressure water into the formation sand (16) within the tank (10) through the first branch (32) of the furcated conduit (30) in order to create the sand-water slurry within the tank comprises pipe (50) having a pipe first end (54) and a pipe second end (56) and a length adequate to transverse the length of the furcated conduit plus the radius of the tank so that said pipe first end is proximate to the vertical axis (58) of the tank (10). The pipe second end (56) extends from the first branch flanged second end (38). The act of inserting the pipe into the first branch flanged second end creates an annulus (60) within the first branch. The annulus is sufficiently dimensioned to permit an adequate flow of sand-water slurry from the tank and into the second branch of the furcated conduit. The annulus at the first branch flanged second end is sealed by suitable sealing means (62) to prevent leakage of sand-water slurry.

Nozzle (52) is attached to the pipe (50) first end (54). The nozzle is perforated (64) to create a spherical spray pattern (66) of high pressure water within the formation sand. In one embodiment of my invention the nozzle has seven (7) holes and each hole is 1/16 inches in diameter. The spherical spray pattern is adapted to mix the formation sand and water within the tank to create the sand-water slurry without causing the oil stored within the tank to substantially mix with the sand-water slurry.

Figure 3:
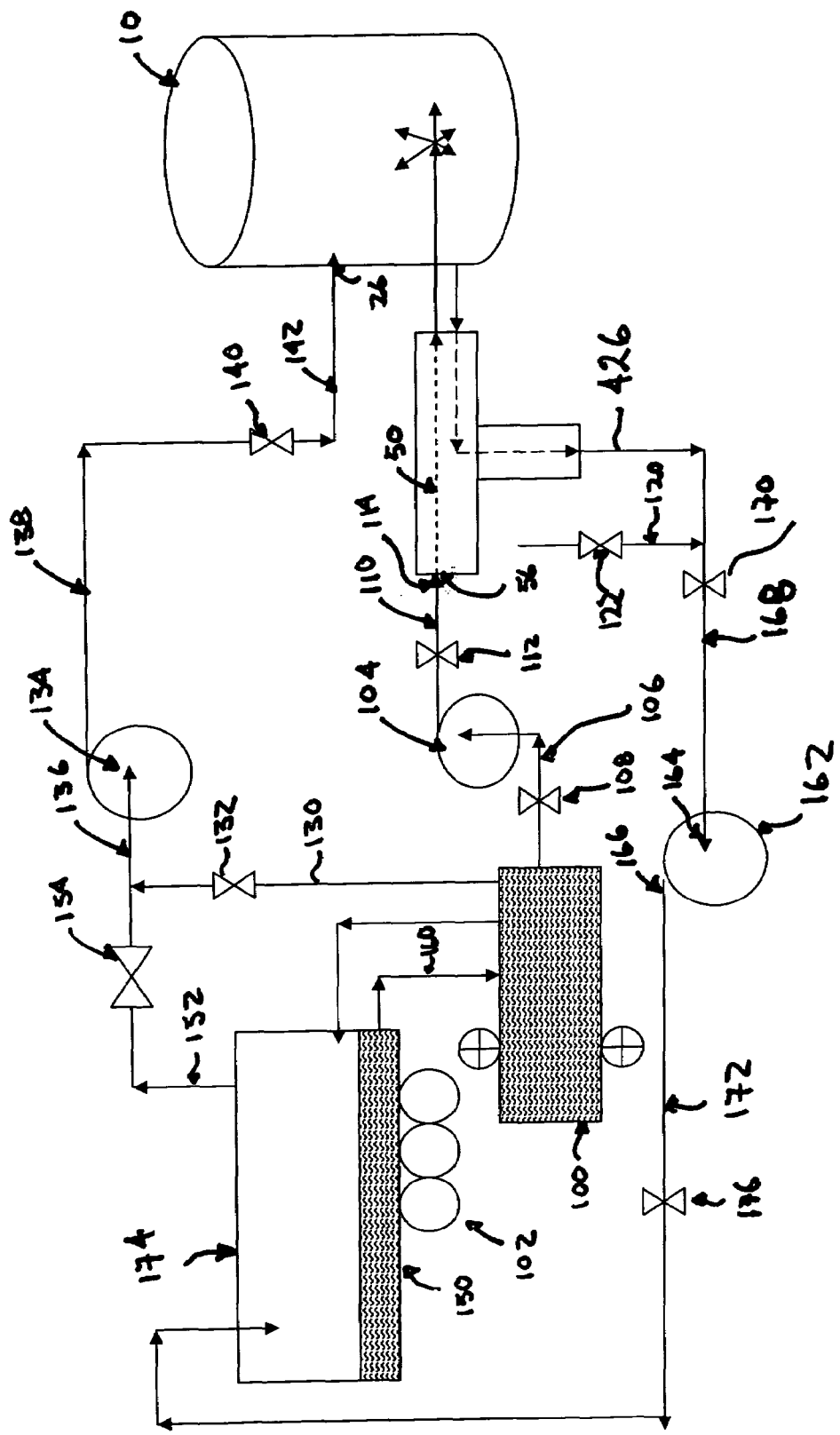
FIG. 3 is a schematic diagram showing the relationship between the various components of my invention.

Referring to FIGS. 2 and 3, the source of high pressure water for injection into the formation sand comprises a reservoir of water (100) that is mounted to the trailer (102) as more fully described below. A first high pressure pump (104) has a suction intake connected to the reservoir of water by an intake conduit (106) and control valve (108). The first pump (104) has a discharge connected to a discharge conduit (110) and is regulated by control valve (112). The discharge conduit has a discharge end (114) connected to the pipe (50) second end (56). The first pump (104) is sized to create a discharge pressure and flow adequate to cause mixture of the sand and water within the tank to form the slurry. First pump (104) is exemplified by the Hydra-Gell™ pump having a maximum flow rate of 35 to 37 gallons per minute having a maximum inlet pressure of 250 psi and a maximum outlet pressure of 1200 psi. First pump generates 300 psi of pressure at the discharge nozzle (52).

Figure 4:
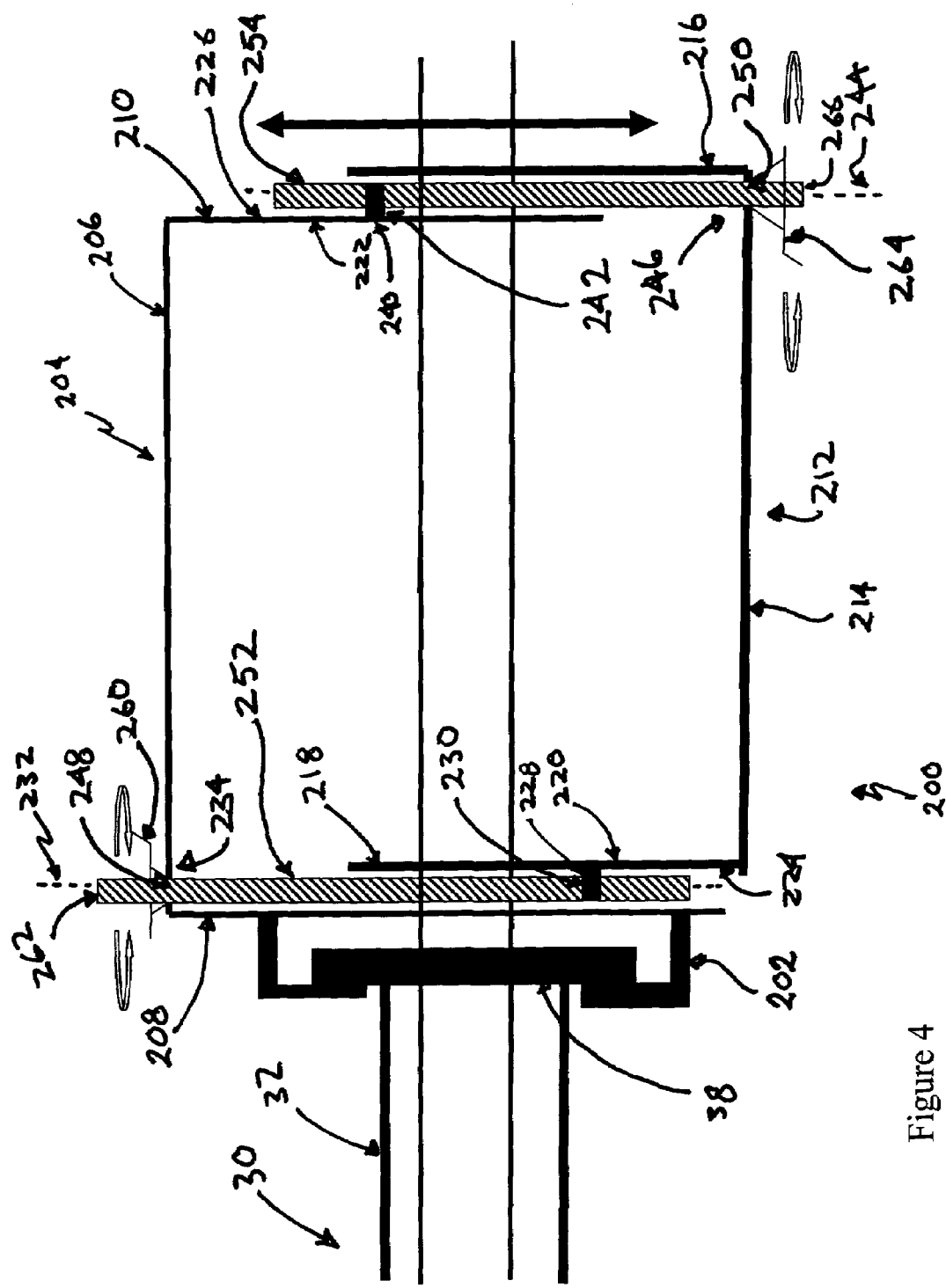
FIG. 4 is a top view showing the mounting frame of the forcing means used to force the steel pipe into the formation sand within the remote field storage tank.

Referring now to FIG. 4, since the formation sand is going to be compacted at the bottom of the tank, there is a requirement to be able to force the nozzle (52) into the formation sand (16) by forcing means. In my invention forcing means for forcibly inserting the pipe into the formation sand comprises rectangular frame (200) removeably mounted by mounting means (202) to the second flanged end (38) of the first branch (32) of the furcated conduit (30). The mounting means may be a bracket adapted to hold the frame (200) to flange (38) or a flange adapted to be bolted to flange (38). A suitable mounting means will be evident to a person skilled in the mechanical arts. The rectangular frame (200) is shown in FIG. 4 in two-dimensions for simplicity and explanatory purposes. Again, a person skilled in the mechanical arts will understand and comprehend that the frame (200) is actually a three-dimensional box structure that is reasonably simple to manufacture without inventive efforts. Frame 200 is made up of a first channel-shaped half-frame (204) having a first back member (206), a first side member (208) and a second side member (210). The rectangular frame (200) also includes a second channel-shaped half-frame (212) having a first back member (214), a first side member (216) and a second side member (218). First channel-shaped half-frame (204) and the second channel-shaped half frame (212) have similar proportions. The second channel-shaped-half frame (212) is positioned opposite the first channel-shaped half frame (204) so that their respective open ends are facing each other. The second channel-shaped half-frame (212) is positioned partially within the first channel-shaped half-frame (204) in a sliding alignment so that the first side member (208) of the first channel-shaped half frame (204) is adjacent to and parallel to the second side member (218) of the second channel-shaped half frame (212) and so that the second side member (210) of the first channel-shaped half frame (204) is adjacent and parallel to the first side member (216) of the second channel-shaped half frame (212). Each of the first (208), (216) and second (210), (218) side members of each of the first (204) and second (212) channel-shaped half-frames have inside (220), (222) and outside (224), (226) surfaces.

A first protruding member (228) is fixed to the outside surface (224) of the second side member (218) of the second half-frame (212). The first protruding member (228) is perpendicular to the second side member of the second half-frame. The first protruding member includes a first threaded aperture (230) having an axis (232) parallel to the second side arm of the second-half frame. The axis (232) intersects the first back member (206) of the first half-frame (204) at a point (234) adjacent to the intersection of the first half-frame first back member and first side member.

A second protruding member (240) is fixed to the outside surface (226) of the second side arm (210) of the first-half frame (204). The second protruding member (240) is perpendicular to the second side arm (210) of the first half-frame. The second protruding member includes a second threaded aperture (242) having an axis (244) parallel to the first side arm (216) of the second half-frame (212). The axis (242) intersects the first back member (214) of the second half-frame at a point (246) adjacent to the intersection of the second half-frame first back member and first side member.

A third threaded aperture (248) is located where the axis (232) of the first threaded aperture (228) intersects the first half-frame first back member (206). The third threaded aperture has a thread and diameter identical to the first threaded aperture (228).

A forth threaded aperture (250) is located where the axis (244) of the second threaded aperture intersects the second half frame first back member (214). The forth threaded aperture has a thread and diameter identical to the second threaded aperture (242).

A first threaded rod (252) having a length at least equal to the length of the first half-frame first side member (208) is threadably engaged with the third aperture (248) and the first aperture (228), so that when the first threaded rod is turned in a clock-wise direction the first back members of the first and second half-frames are drawn together and when the first threaded rod is turned in a counter-clockwise direction the first back members of the first and second half frames are moved apart.

A second threaded rod (254) having a length at least equal to the length of the second half-frame first side member (216) is threadably engaged with the forth aperture (250) and the second aperture (242), so that when the second threaded rod is turned in a clock-wise direction the first back members of the first and second half-frames are drawn together and when the second threaded rod is turned in a counter-clockwise direction the first back members of the first and second half frames are moved apart. A first handle (260) is fixed proximate to the first end (262) of the first threaded rod (252) for turning the first threaded rod. A second handle (264) is fixed to the first end (266) of the second threaded rod (254) for turning the second threaded rod.

Figure 5:
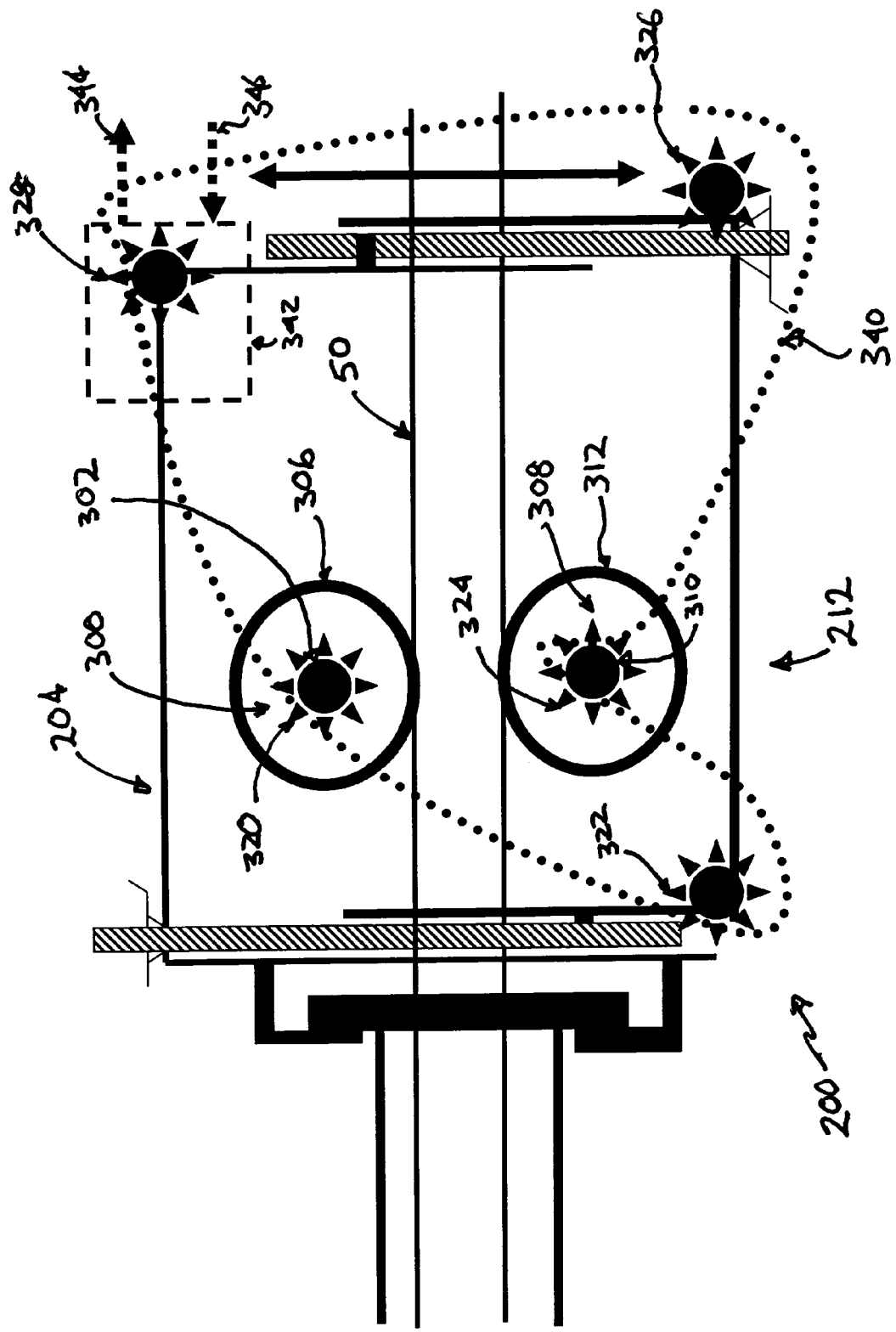
FIG. 5 is another top view showing the driving gears and drive wheels of the forcing means used to force the steel pipe into the formation sand.

Referring now to FIG. 5, the forcing means of my invention further comprises a first drive wheel (300) mounted on an axle (302). The axle (302) is positioned within the first half-frame (204) and positionally fixed with respect to the first half-frame. Hence when the first half frame moves the first drive wheel moves with it. The first drive wheel (300) includes an engagement surface (306) adapted to move into frictional engagement with the pipe (50). A second drive wheel (308) is mounted on an axle (310) positioned within the second half-frame (212). The second drive wheel (308) is positionally fixed with respect to the second half-frame (212) so that when the second half-frame move the second drive wheel moves with it. The second drive wheel (308) includes an engagement surface (312) adapted to move into frictional engagement with the pipe (50) at a position which is opposite the place of frictional engagement of the first drive wheel with the pipe. Also included is a plurality of drive gears (320), (322), (324), (326), and (328) mounted to the frame and adapted to drive in a forward and reverse direction, a drive chain (340) connecting each of the drive wheels to a motor (342) so that each of the drive wheels counter-rotate and wherein each of the drive wheel frictional engagement surfaces are in frictional contact with the pipe and act to provide a motive force to the pipe thereby pushing it into the formation sand within the tank. The motor (342) is hydraulically powered and the hydraulic power is generated remotely from the truck and transferred to the motor by way of hoses (344) and (346). The frictional engagement surfaces (306) and (312) are preferably fabricated from a heat resistant polymer. There is also a port (61) located in the second branch (34) adapted to permit the injection of treatment chemicals such as floc agents into the slurry stream. Injection conduit (63) is shown fixed to port (61).

Figure 6:
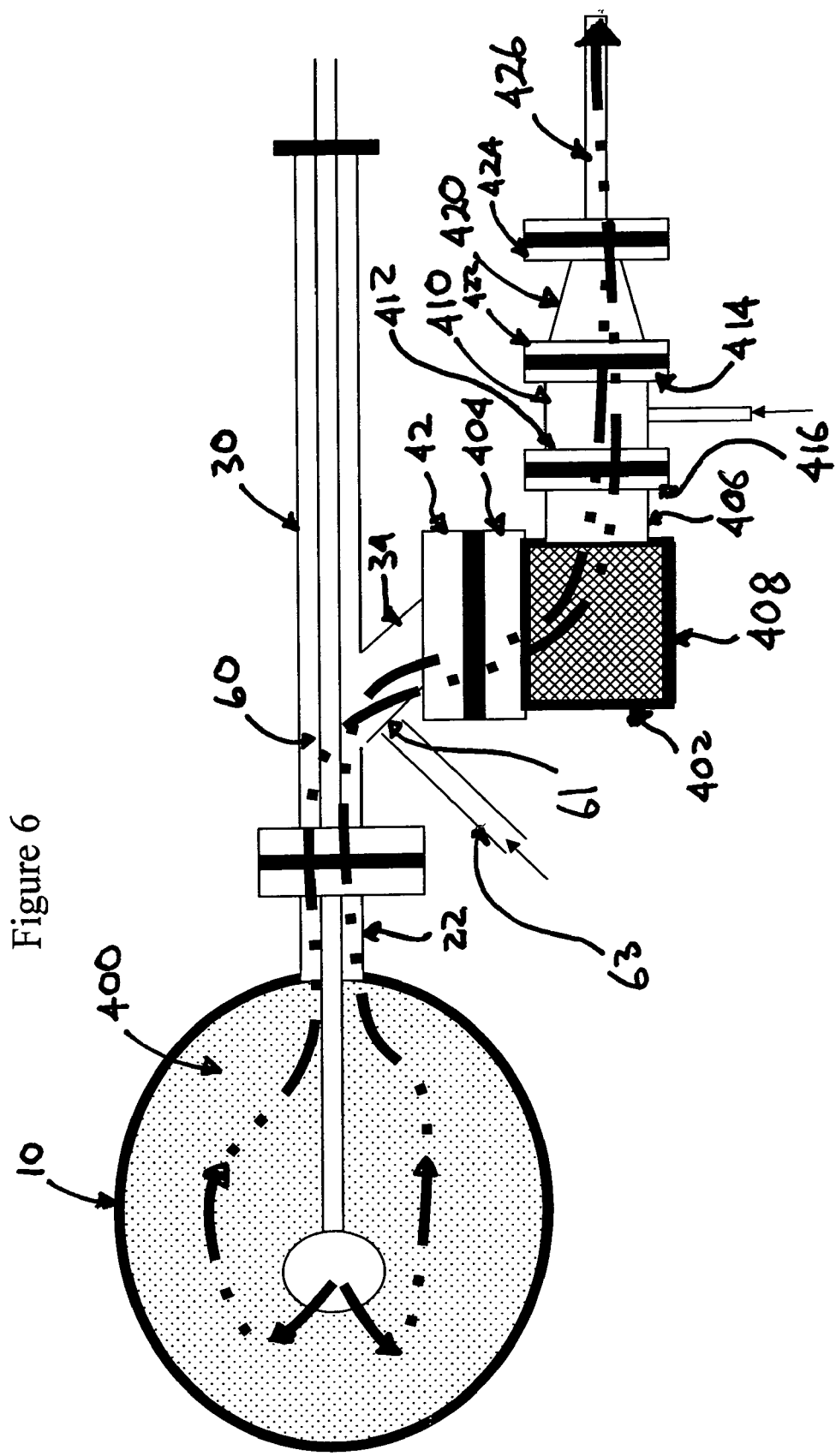
FIG. 6 is a top view of apparatus of my invention used draw slurry from the remote field storage tank.

Now referring to FIG. 6, there is illustrates the manner in which the slurry (400) is withdrawn from the tank (10). Once the slurry is formed it is forced by hydrostatic pressure to flow out of drain (22) and into annulus (60) and then into the second branch (34) of the furcated conduit (30). Attached to the second branch (34) second end (42) is a screen chamber (402) having an inlet end (404) and a discharge end (406). The screen chamber is attached to the second branch second flanged end (42) and is adapted to trap debris within the slurry that is not suited for pumping. The debris can be periodically removed from the screen chamber by way of hatch (408). In order to assist in drawing the slurry out of the tank, my invention includes a suction creation means mounted within housing (410). The housing (410) has an inlet end (412) and a discharge end (414). The housing inlet end (412) is attached to the discharge end (416) of the screen chamber (402). The suction creation means is adapted to create a suction across the pump housing in order to promote the removal of slurry from the tank. A reduction nozzle (420) having an inlet end (422) and a discharge end (424) is attached to the discharge end (414) of the housing (410).

Figure 7:
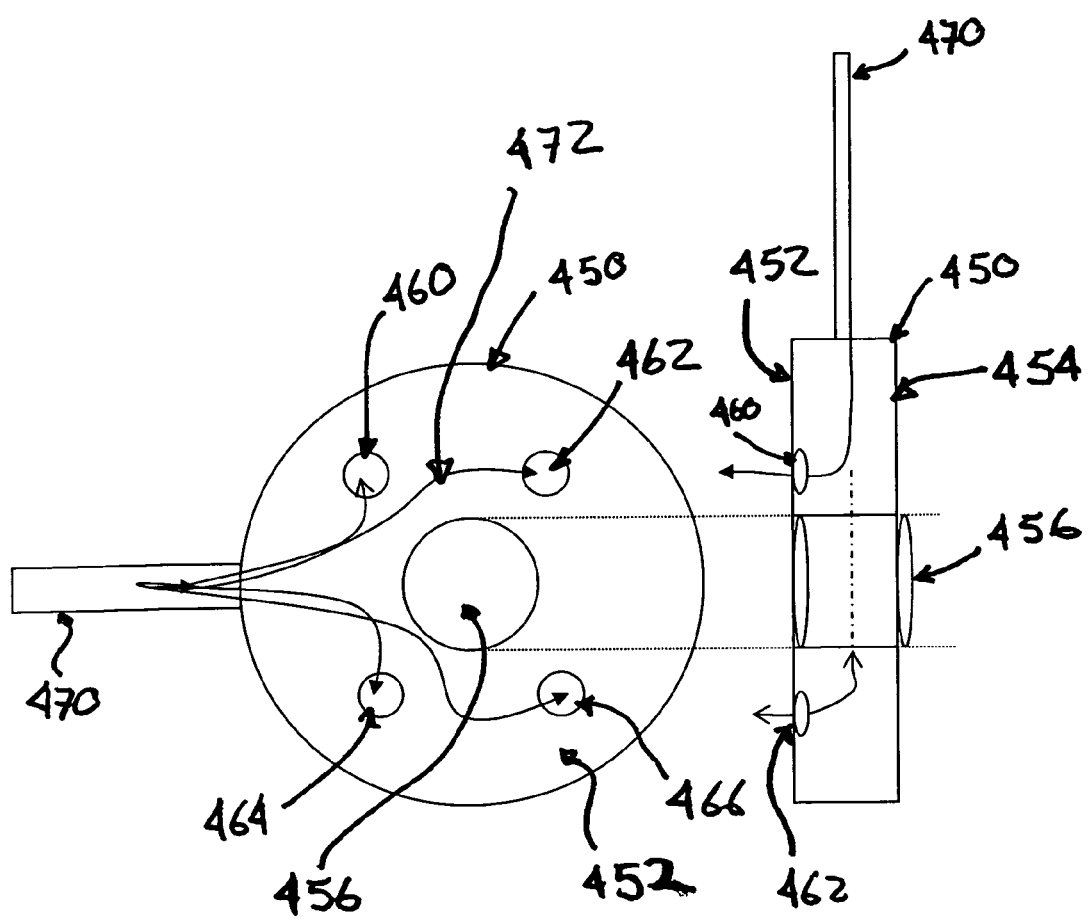
FIG. 7 is a side and sectional view of the water driven pump used in my invention.

The reduction nozzle is adapted to accelerate the flow of slurry into an adjacent reduction nozzle discharge conduit (426) attached to the discharge end of the reduction nozzle. Referring now to FIG. 7, there is illustrated one embodiment of a suction creation means used in my invention. The suction creation means comprises a disc (450) mounted within the housing (410). The disc has an upstream face (452) and a down stream face (454). The disc is apertured (456) at its centre to permit the flow of slurry. There are also a plurality of water discharge ports (460), (462), (464) and (466) positioned on the downstream face (452). Each of the ports are in communication with a source of high pressure water (470). High pressure water is directed to the water discharge ports by a plurality of channels (472) located within the disc. In operation, the slurry is forced through aperture (456) and accelerated. The slurry is further diluted by the water being injected into the slurry stream by the water discharge ports. The effect is to create a pressure differential across the disc, where the upstream face (454) has a higher pressure than the down stream face (452) of disc (450). This has the further effect of suctioning the slurry from the tank. Referring back to the flow diagram in FIG. 3, the source of water injection into the slurry stream is shown by conduit (120) and control valve (122). Typically, the high pressure water is received from conduit (470) at 120 psi and a flow rate of about 60 gallons per minute into the disk (450). Conduit (470) is generally two inches in diameter. In operation, a vacuum of about 30 psi can be generated across the disk. The aperture (456) is typically 1⅝ inches in diameter and the water discharge ports are one-quarter inch in diameter but these dimensions are variable. The water powered pump is capable of moving up to 15 cubic meters of slurry from the remote field storage tank (10) per hour.

Still referring to FIG. 3, there is included in my invention a means for injecting low pressure water back into the tank (10) so that the slurry maintains adequate water content for pumping. Reservoir of water (100) is used as an initial source for the low pressure water. The water is drawn from reservoir (100) by means of conduit (130) and control valve (132). Conduit (132) is connected to a second pump (134) suction intake conduit (136). The discharge of the second pump (134) is to discharge conduit (138). Control valve (140) controls low pressure water flow into conduit (142). The flow enters the tank at port (26). Second pump (134) is capable of a maximum pressure of 100 psi and is able to pump 232 gallons per minute at 10 psi. Once the dewatering process has commenced, the reservoir (100) will be replenished from sump (150) that transfers recovered water by conduit (160) to the reservoir. In this way, the water that was originally contained in the tank (10) is recycled back into the tank. It is then later removed for further treatment.

Referring now to FIG. 6 and FIG. 3, there is illustrated the means for transporting the slurry from the tank to the remote slurry dewatering means. There is included a third pump (162) adapted to pump slurry. The third pump has a suction intake port (164) and a discharge port (166). A third pump suction intake conduit (168) is attached to the third pump suction intake port (164). The third pump suction intake conduit (168) is in turn attached to the reduction nozzle (420) discharge conduit discharge end (424) by way of an intermediate conduit (426). Control valve (170) is installed on the third pump suction intake conduit (168) to control the flow of slurry to pump (162). A third pump discharge conduit (172) is attached to the third pump discharge port (166). The third pump discharge conduit is adapted to transport the slurry from the third pump to the remote container (174) which contains the dewatering means further explained below. Control valve (176) is included on conduit (172) to control the flow of slurry into container (174). The third pump (162) is typically a centrifugal pump exemplified by the MAGNUM 1™ pump manufactured by Mission. This pump is capable of moving up to 15 cubic meters of slurry per hour.

Figure 8:
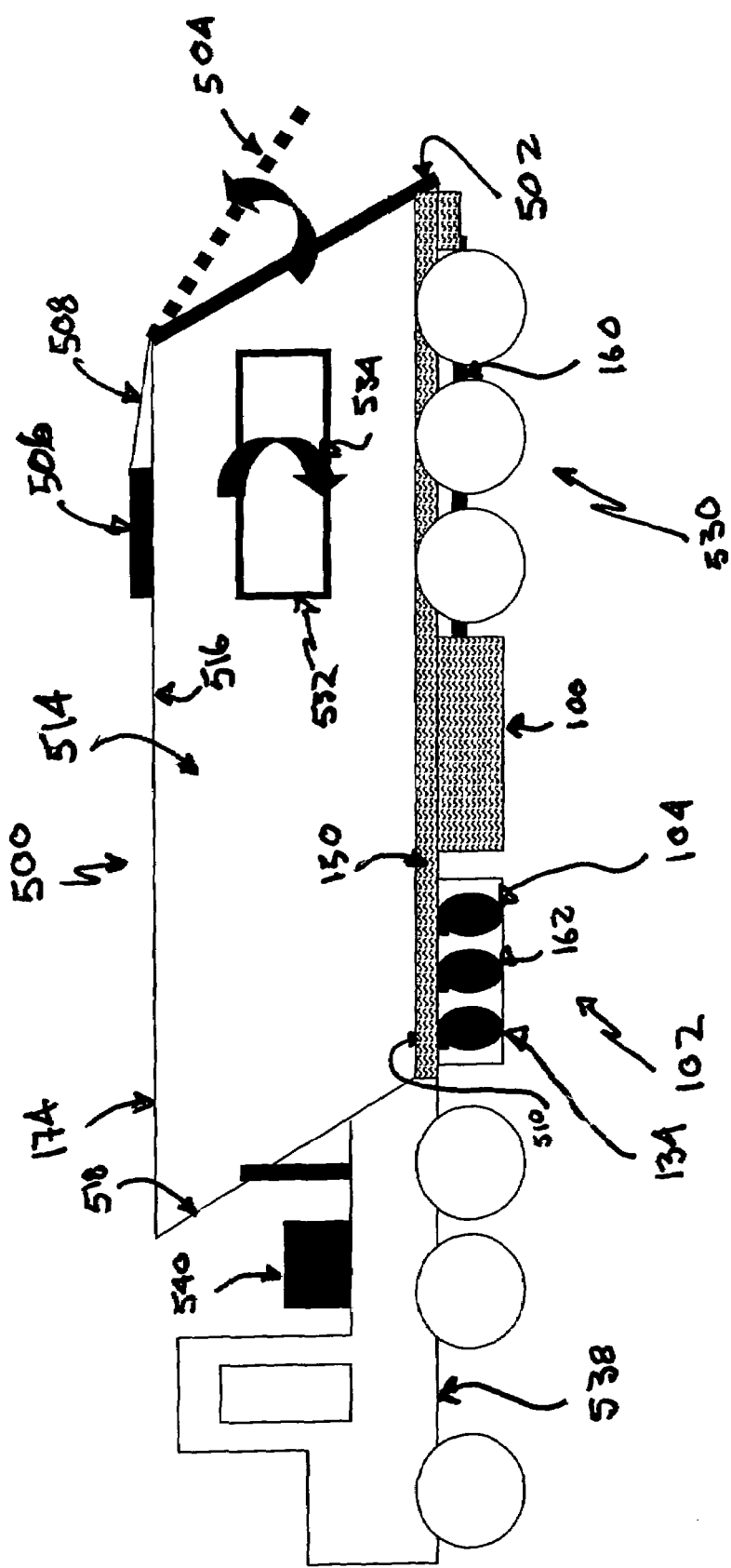
FIG. 8 illustrates the mobile trailer of one embodiment of my invention.

Now referring to FIG. 8, there is shown a drawing depicting the major aspects of the dewatering means of my invention. The dewatering means comprises a container (174) mounted on a trailer (102). The container is preferably an open box trailer as depicted in FIG. (11) having a volume of approximately 50 cubic meters. The container has an open top (500) for receiving slurry from conduit (172) as further explained below. The container has a rear gate (502) having a first closed position for receiving slurry and a second open position (504) for discharging dewatered formation sand. The gate is adapted to be leak free using suitable sealing means when in the closed position. A hydraulic piston (506) and suitable levers (508) are used to open and close the gate. The bottom surface (510) of the container (174) is equipped with slurry dewatering means and a sump (150). The container also has a first side wall (514) having a top edge (516) and a bottom edge (not shown in this figure but depicted in FIG. 12). The first side wall has an inside surface that is equipped with slurry dewatering means. The second side wall of the container also has a top edge and a bottom edge and is equipped with slurry dewatering means. The container front wall (518) is also equipped with slurry dewatering means. The sump (150) is located above the bottom surface for collecting water separated from the slurry as more fully explained below. Also mounted to trailer (102) is reservoir tank (100) and conduit (160). Reservoir (100) is approximately 2.27 meters in volume and is mounted ahead of the wheels (530). Pumps (104), (134) and (162) with conduits are also mounted to the trailer. The trailer includes an operator platform (532) shown in its folded configuration and can be folded down as depicted by arrow (534). The truck (538) provides a source of hydraulic power (540) to drive the hydraulic motors and pistons.

Figure 9:
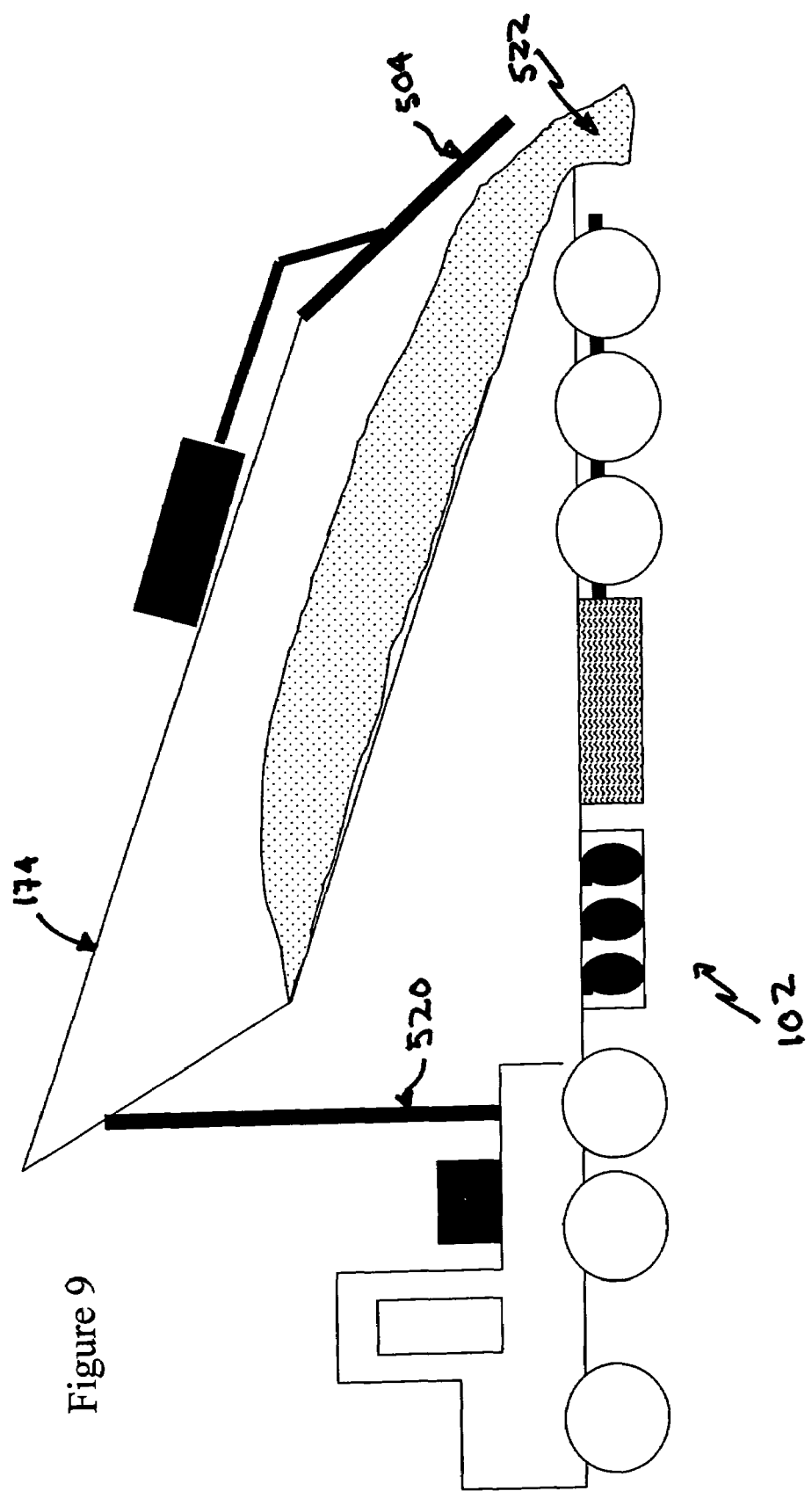
FIG. 9 shows the mobile trailer of my invention dumping dewatered sand.

Referring now to FIG. 9, the trailer (102) is equipped with a hydraulic lift (520) so that the container (174) may be included to dump dewatered sand (522) may be discharged from the open rear gate (504) by gravity.

Figure 10:
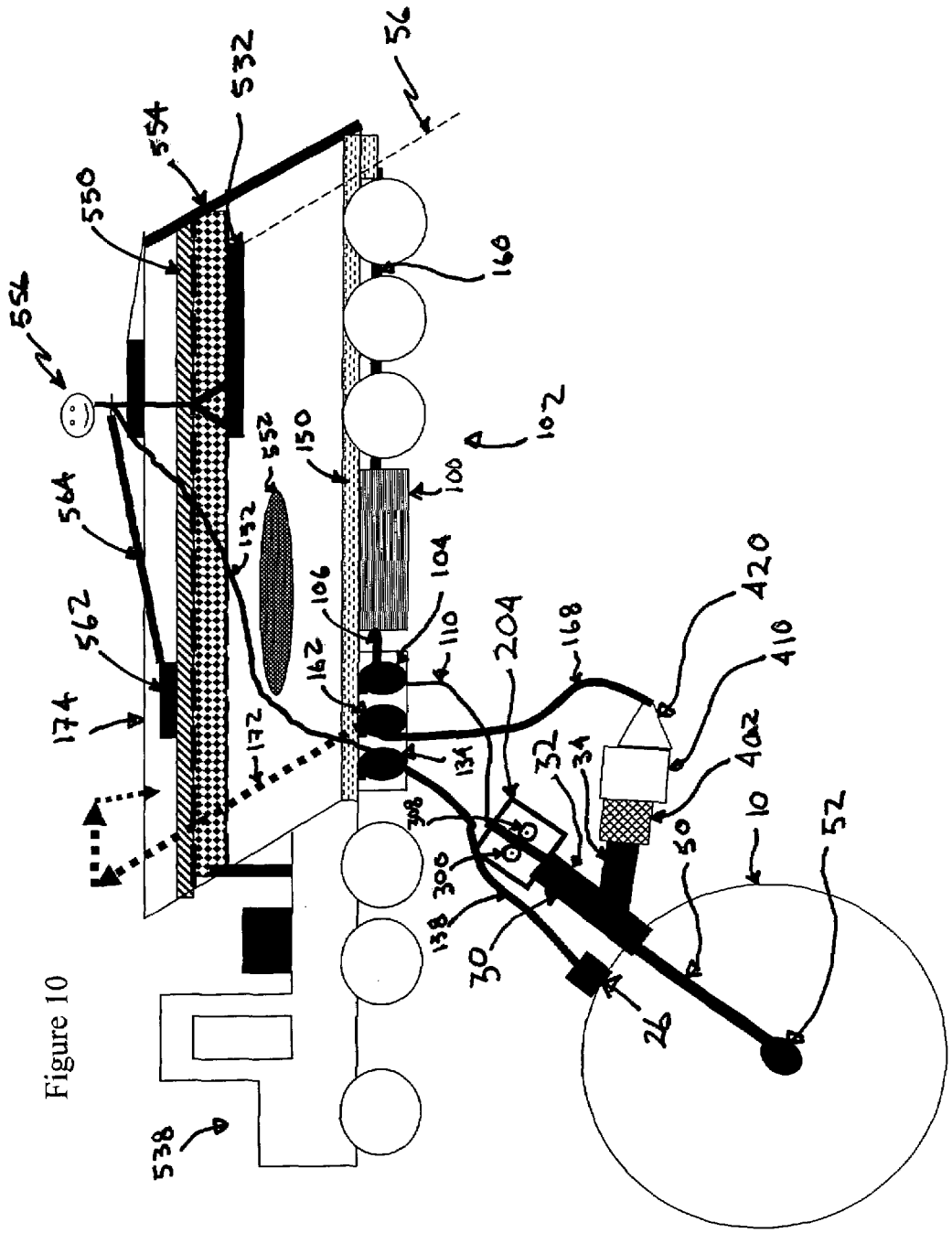
FIG. 10 shows the mobile trailer of my invention attached to the furcated conduit for removing and transporting slurry.
Figure 11:
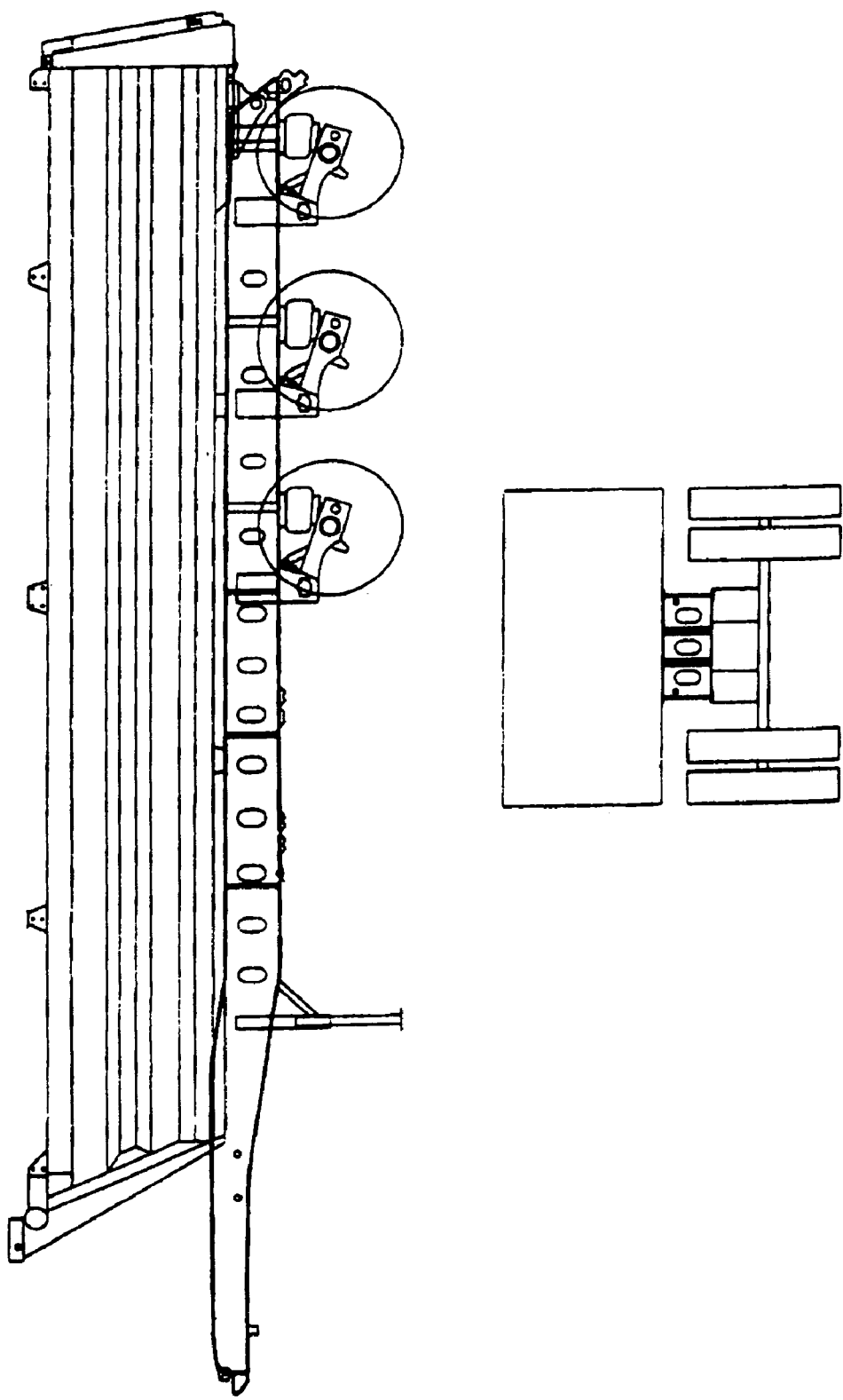
FIG. 11 shows a typical hopper-type trailer used in my invention.

Referring now to FIG. 10, FIG. 6 and FIG. 3, there is depicted the invention in operation. Truck (538) positions trailer (102) in close proximity to tank (10). Furcated conduit (30) is mounted to the tank drain (22). Frame (204) with drive wheels (300) and (308) is mounted to the furcated conduit first branch (32). Pipe (50) is depicted inserted into the tank formation sand by the drive wheels (300) and (302). The nozzle (52) is shown in the approximate centre of the tank. High pressure injection water is provided to pipe (50) by way of conduit (110). High pressure pump (104) intake conduit (106) is depicted drawing water from reservoir (100). Reservoir (100) is replenished using water collected in sump (150) and transferred to reservoir (100) by way of conduit (160).

Slurry is removed from the tank by way of the annulus between pipe (50) and the first branch (32) of the furcated conduit and the second branch (34) of the furcated conduit (30). Depicted in FIG. 10 are the screen chamber (402) the housing (410) and the reduction nozzle (420). The reduction nozzle discharges slurry into conduit (168) which is attached to the intake of pump (162). Pump (162) discharges into conduit (172) and transfers slurry into the container (174).

Water that is recycled from the slurry is collected in sump (150) and transferred to reservoir (100). This water is then transferred back to the tank (10) by way of low pressure pump (134). Low pressure pump (134) discharges into conduit (138) that is ultimately connected to port (26) on tank (10). This lower pressure water maintains slurry consistency for pumping. Once the slurry has been dewatered, all the collected water will be recycled back into the tank for later collection and further treatment. In this way there is no need for the trailer (102) to have a large reservoir (100) capable of handling the entire volume of water stored in the tank.

As previously mentioned, some oil will be pumped out of the tank with the slurry. This oil will be pumped into the container (174) and will naturally float to the surface of the slurry. This is depicted in FIG. (10) as layer (550). The sand will settle to the bottom of the container. The volume of sand is depicted at (552) below oil layer (550) and water layer (554). Operator (556) stands on platform (532) accessible by retractable ladder (560). The operator manipulates an oil skimmer comprising a suction head (562) and a buoyant suction hose (564). The discharge of hose (564) is attached to conduit (152) and subsequently to the intake of pump (134). In this way the oil that is collected with the slurry is returned to the tank by way of port (26) for further processing. This eliminates most of the hydrocarbon contamination of the formation sand.

Figure 12:
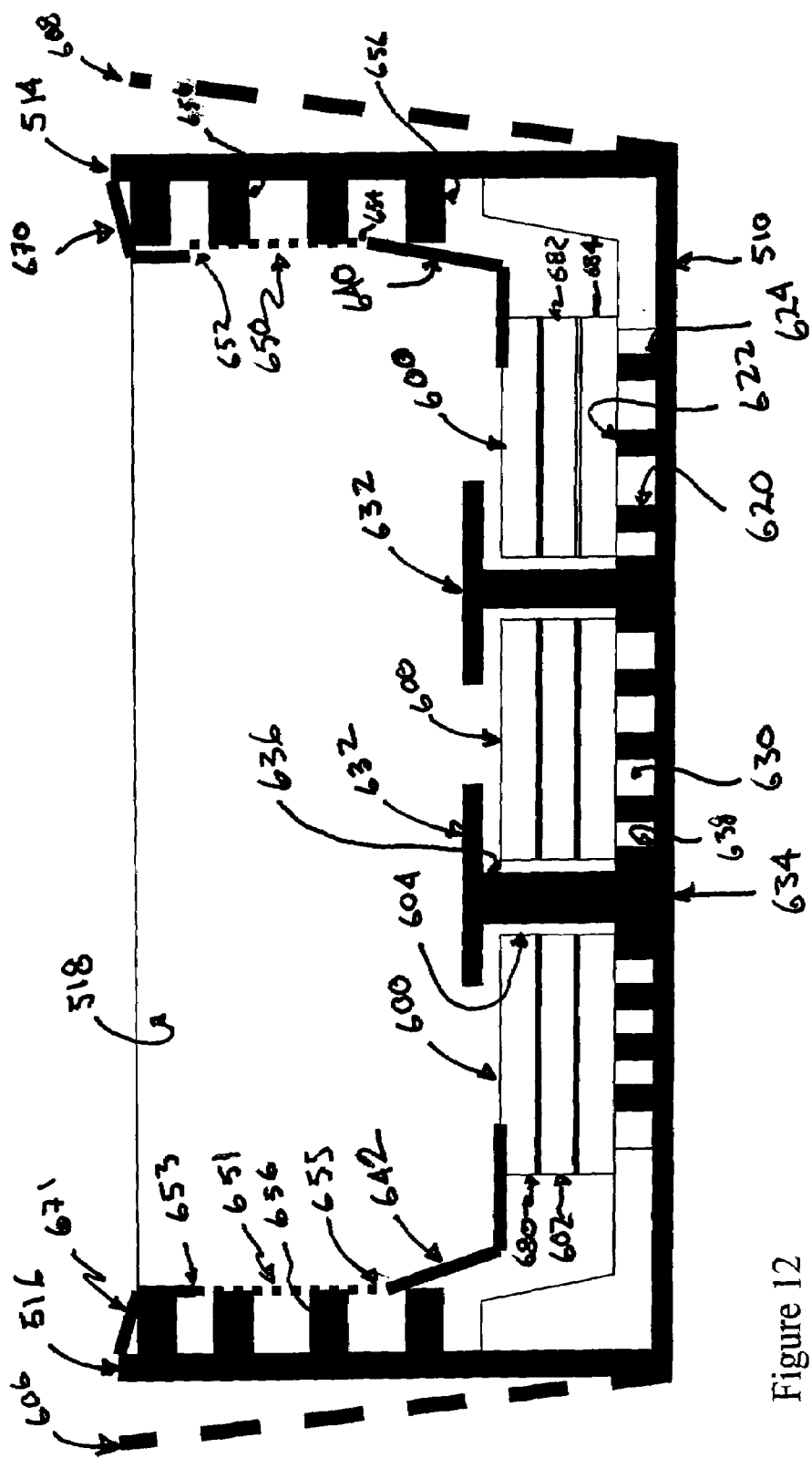
FIG. 12 shows in cross-section the inside of the container and the arrangement of the screen panels and impervious metallic panels.

Referring now to FIG. 12, there is shown the details of the inside side wall and bottom surfaces of the container (174) that comprise the slurry dewatering means. The viewer is looking in through the rear gate (502) towards front wall (518). As shown in FIG. 12, the dewatering means includes a plurality of rectangular filter strips (600). The filter strips have, in relation to the trailer, a foreword edge located proximate to the front wall (518), a rearward edge located proximate to the rear gate (502), a first side edge (602) and a second side edge (604). The first and second side edges are parallel to the first (514) and second (516) side walls. The side walls may also be inclined as depicted by dashed lines (606) and (608). The rectangular filter strips (600) are mounted parallel to each other and have a length substantially equal to the length of the first and second side walls. The rectangular filter strips (600) are mounted above the bottom surface (510) of the container on a plurality of raised mounts (620) each having a top end (622) and bottom end (624). The top surface of the raised mounts are attached to the to the bottom surface of the filter strips and the bottom surfaces of the raised mounts are attached to the bottom surface of the container. In this manner there is formed a plurality of cavities (630) which together act as the sump for collecting water from the slurry. Also includes as part of the dewatering means are a plurality of impervious metallic rectangular strips (632). Each of the impervious metallic rectangular strips is placed between two adjacent spaced apart rectangular filter strips (600). The metallic rectangular strips are fixed to the bottom surface by way of mount (634) having a top end (636) and a bottom end (638) and a height slightly higher than the adjacent rectangular filter strips. The impervious metallic rectangular strips have a width sufficiently wide to slightly overlap the adjacent rectangular filter strips. The mounts (634) are sufficiently sized to support the weight of slurry material above the impervious metallic rectangular strips and are adapted to prevent the adjacent rectangular filter strips from being crushed by the weight of slurry material above them.

Also included in the dewatering means is a first flow directing member (640) mounted between the rectangular filter strip (600) adjacent the first side wall (514) for directing downward flow of slurry and water adjacent to the first side wall onto the adjacent rectangular filter strip. The first flow directing means (640) is fabricated from metal and has a length equal to the length of the adjacent rectangular filter strip. A second flow directing means (642) is mounted between the rectangular filter strip adjacent to the second side wall (516) for directing downward flow of water and slurry adjacent to the second side wall onto the adjacent rectangular filter strip. The second flow directing means is fabricated from metal and has a length equal to the length of the adjacent rectangular filter strip.

Still referring to FIG. 12, the construction of the container side wall slurry filtering means is shown. There is a first single rectangular filter strip (650) having, in relation to the trailer, a foreword edge located proximate to said front wall, a rearward edge located proximate to the rear gate, a top edge (652) and a bottom edge (654). The top edge (652) is located below the top edge of the side wall (514) and the bottom edge (654) is located above the side wall bottom edge. The first single rectangular filter strip (650) is mounted by mounting means (656) to the first side wall in a spaced apart relationship creating a gap between the first side wall and the first single rectangular filter strip. Also included is a first single impervious metallic capping strip (670) mounted on the top edge of the first rectangular filter strip adapted to prevent slurry from falling behind the first rectangular filter strip. On the second side wall (516) there is a slurry dewatering means comprising a second single rectangular filter strip (651) having, in relation to the trailer, a foreword edge located proximate to said front wall, a rearward edge located proximate to the rear gate, a top edge (653) and a bottom edge (655). The top edge is located below the top edge of the second side wall (516) top edge and the said bottom edge is located above the second side wall bottom edge. The second single rectangular filter strip is mounted by mounting means (656) to the second side wall in a spaced apart relationship creating a gap between the second side wall and the second single rectangular filter strip. Also included is a second single impervious metallic capping strip (671) mounted on the top edge of the second rectangular filter strip adapted to prevent slurry from falling behind the second rectangular filter strip.

Still referring to FIG. 12, the rectangular filter strips (600), (650) and (651) that are mounted to the bottom and side walls respectively of the container comprise a first layer (680) comprising a mesh having a coarse grid one inch grid pattern adapted to screen debris and breaking up lumps of slurry. There is a second layer (682) comprising a mesh having a fine grid, preferably a mesh of 120, adapted to separate water from formation sand in the slurry. There is also a third layer (684) comprising a coarse mesh having a one inch grid pattern adapted to provide support to the said first and second meshes. While FIG. 12 does not depict filters (600), (650) and (651) as identical, it is to be understood that their construction is the same three-layered construction.

Figure 13:
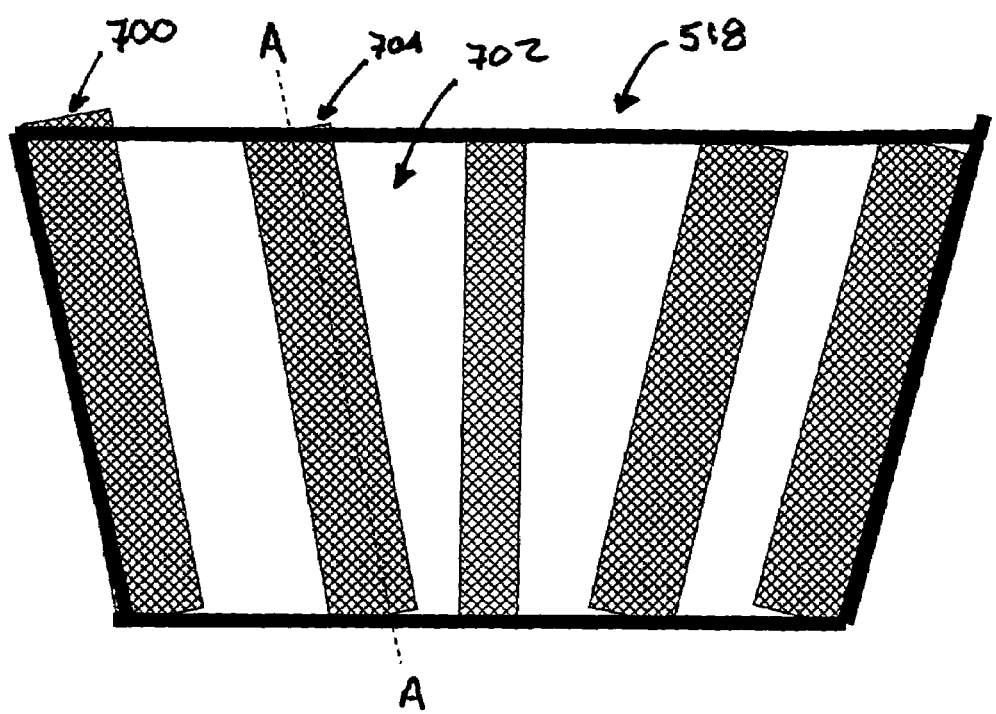
FIG. 13 shows the inside wall of the front of the container and the arrangement of the screen panels and the impervious metallic panels.

Now referring to FIG. 13, there is shown the placement of the wall front filtration means. There is a plurality of alternating rectangular filter strips (700) and impervious metallic strips (702) mounted to the front wall (518) of the container.

Figure 14:
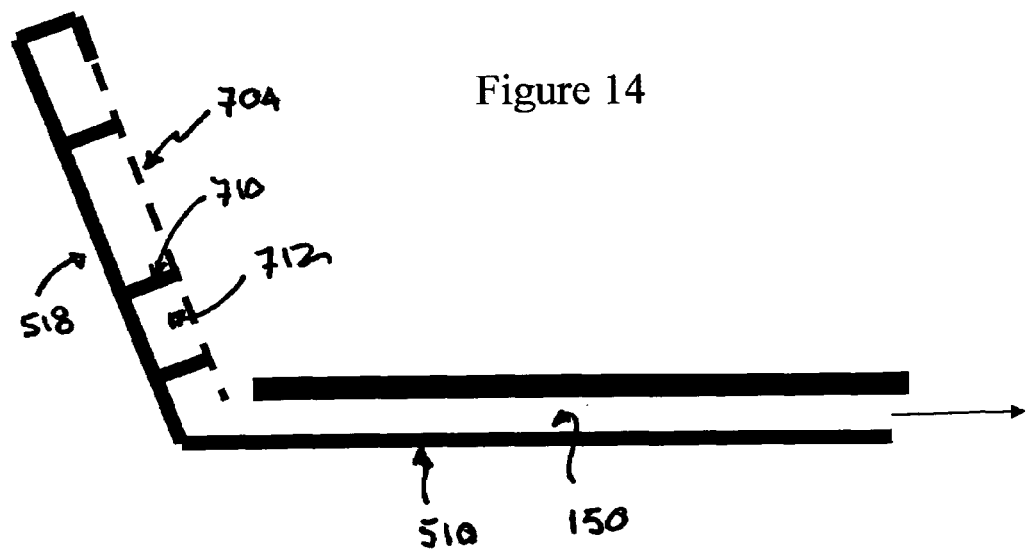
FIG. 14 shows a sectional view of A—A indicated in FIG. 13.

Now referring to FIG. 14, there is shown Section A-A- from FIG. 13 depicting the front wall (518) in cross section through a filter strip (704). The front wall of the container rises at a slight incline from the floor (510) of the container. The incline need not be severe and is generally present in many commercial dump and hopper trailers. Filter strip (704) is illustrated by the dashed line but it is to be understood that this filter strip has the same triple layer construction as the filter strips (600) mounted to the bottom (510) of the container. The filter strips (704) and impervious metallic strips (702) are supported away from the front wall of the front of the container by metallic supports (710) creating a gap (712) of about one inch between the bottom of the filter strips and the front wall. This channel permits water to escape the formation sand slurry and flow to the floor where sump (150) takes water to the back of the container for transfer to reservoir (100).

Figure 15:
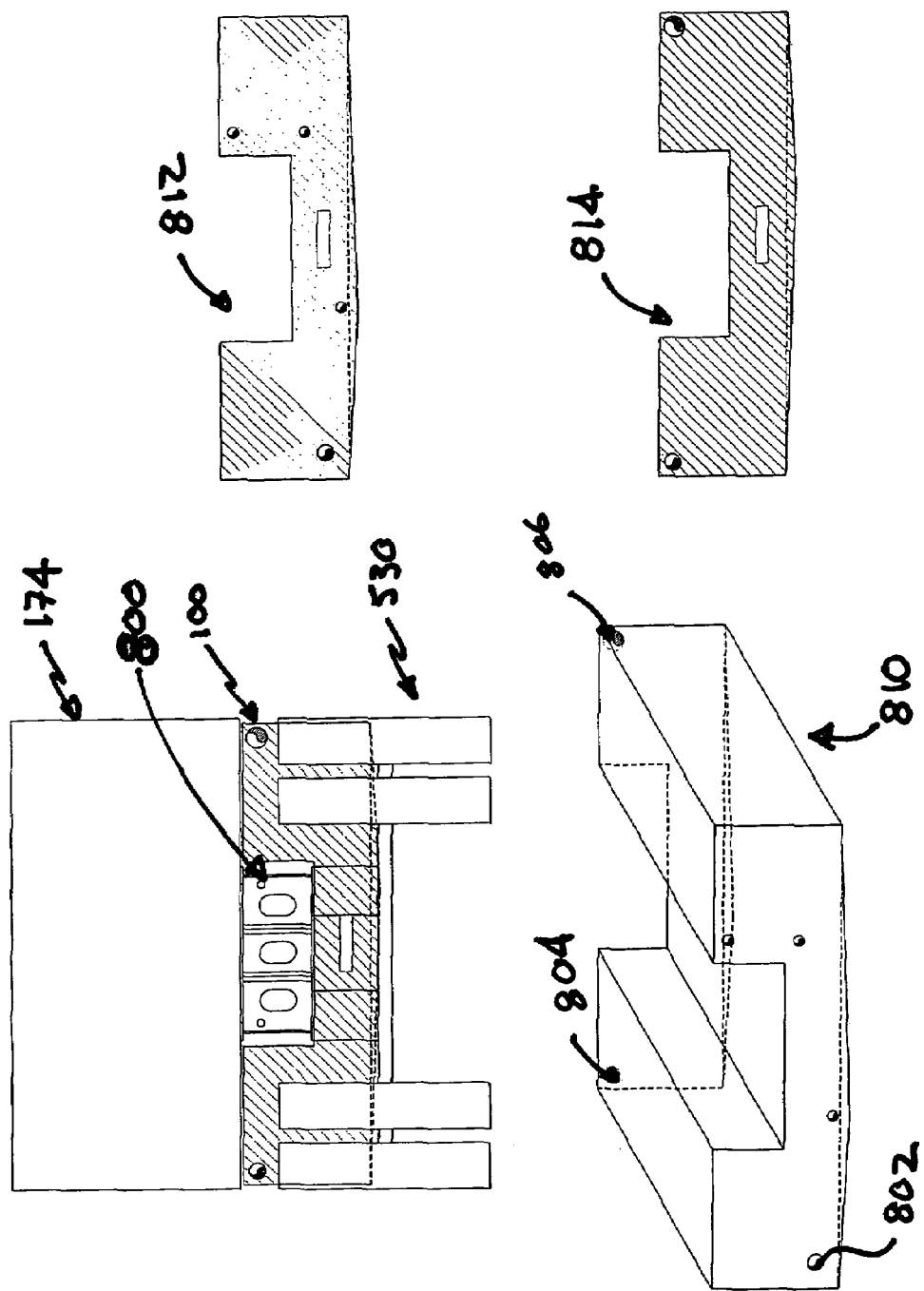
FIG. 15 shows the location of the water reservoir on the trailer of my invention.

Referring now to FIG. 15, there is shown the positional relationship in an elevation view between reservoir (100) and various other components of my invention. Different views are also provided based on this FIG. 15. Trailer frame (800) is mounted to wheel assembly (530). The container (174) is mounted to the top of the frame. Reservoir (100) is mounted below the frame and ahead of the wheel assembly. This is shown in FIG. 8. Various connection ports (802) are illustrated on the tank. Ports (804) and (806) are air vents to vent the tank as it fills or empties. A perspective view of the tank is shown as (810). A front view is shown as (812) and a rear view is shown as (814).

Figure 16:
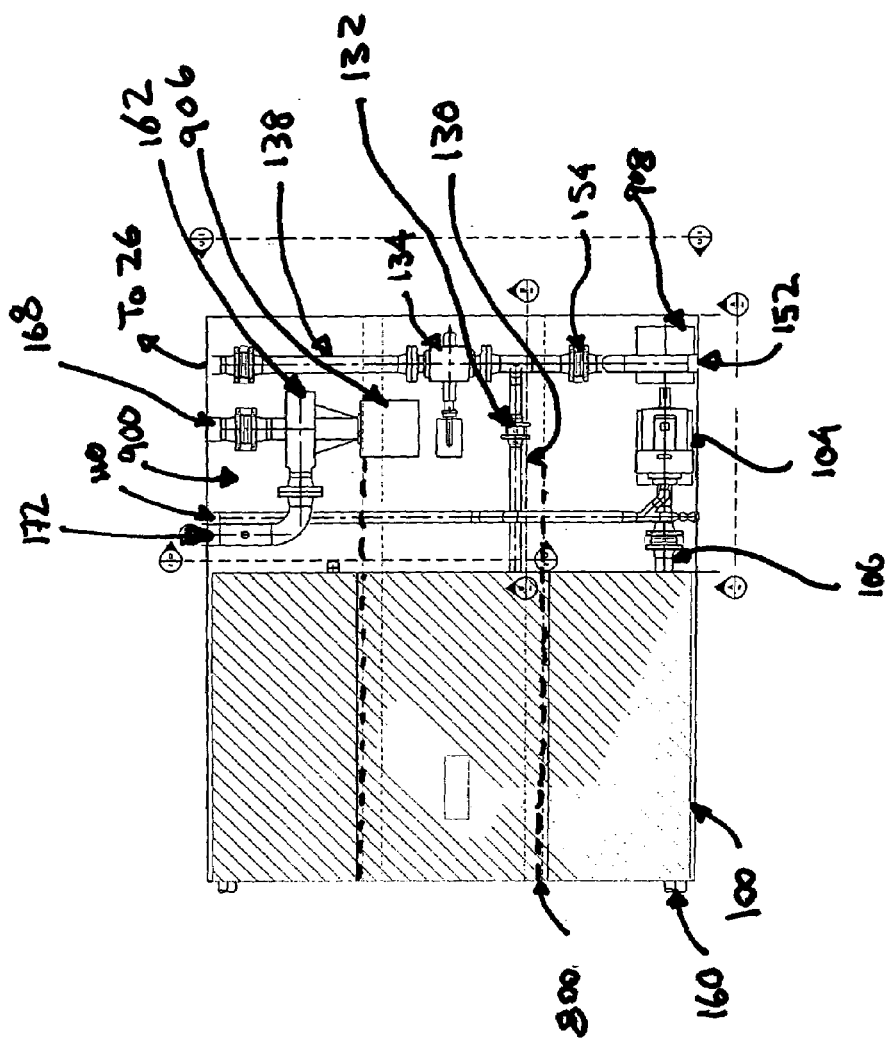
FIG. 16 shows where various pumps and conduits are mounted on the trailer in relation to the position of the water reservoir.

Referring now to FIG. 16, there is shown the preferred location of various components of my invention mounted to the trailer ahead of the reservoir (100). The outline of frame (800) is shown as a dotted line. In order to mount the components shown in FIG. 16, there is a mounting platform (900) fixed to the frame ahead of reservoir (100). Low pressure water pump (134) is mounted proximate to the front middle of platform (900). Intake from the skimming means, conduit (152) is shown attached to the intake of pump (134). Control valve (154) is also illustrated. The discharge conduit (138) is shown attached to the discharge of pump (134). The discharge conduit transfers low pressure water to the tank (10) at port (26). Low pressure water pump (134) is also connected by conduit (130) and control valve (132) to reservoir (100). The low pressure pump will initially draw its water from the reservoir. As the dewatering process proceeds, the skimming means is valved in and the low pressure water pump will also recycle the oil floating on the top of the container back into the tank (10).

Also shown in FIG. 16 is the location of the high pressure pump (104) with hydraulic pump motor (908). Pump (104) discharges into conduit (110) which is, in turn, connected to pipe (50). High pressure pump intake conduit (106) is shown connected to the reservoir (100).

Slurry pump (162) is shown with its hydraulic motor (906). The intake of pump (162) is connected to conduit (168) and the discharge of pump (162) is connected to conduit (172). Conduit (172) transfers the slurry to the container. Also shown is the inlet of conduit (160) that transfers recycled water from the sump (150) to the reservoir (100).

Figure 17:
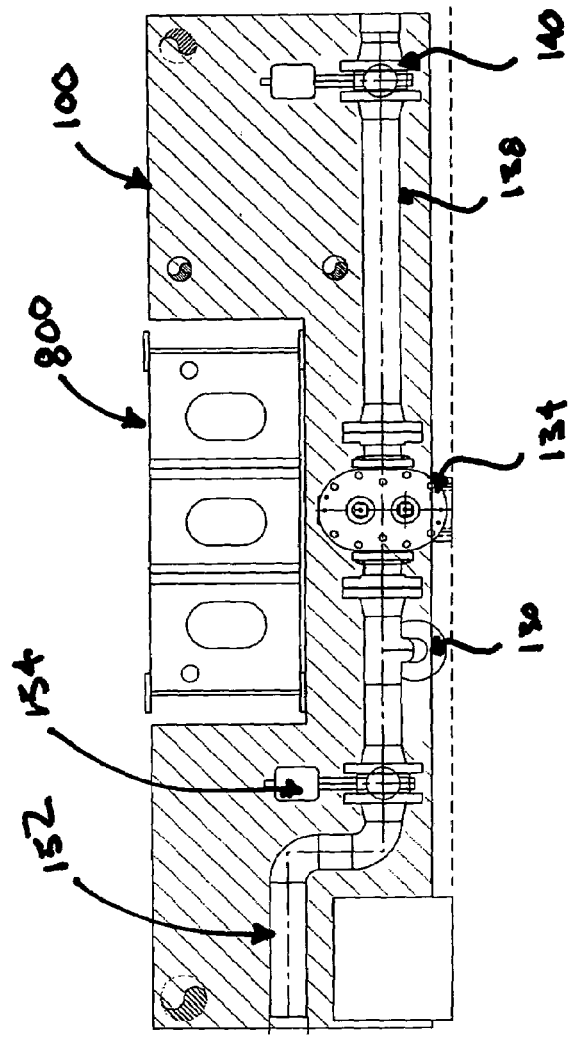
FIG. 17 shows further detail of pump and conduit mounts on the trailer of my invention.

Referring now to FIG. 17, there is shown a view of the arrangement of low pressure pump (134) with respect to the trailer frame (800). The view is from the front of the trailer looking towards the back. Reservoir (100) is positioned behind pump (134). Pump (134) is connected to reservoir (100) by conduit (130). Low pressure pump (134) discharge conduit (138) includes control valve (140) and directs water into the tank (10) by way of port (26). The skimmer means discharge conduit (152) is connected to the intake of the lower pressure pump (134) through control valve (154) and directs oil skimmed from the top of the container back to the tank (10). Pump (134) may pump a combined flow from both the skimmer and the reservoir.

Although the description above contains many specifications, these should not be construed as limiting the scope of the invention but as merely providing illustrations of some of the presently preferred embodiments of this invention. Thus the scope of the invention should be determined by the appended claims and their legal equivalents rather than by the examples given.

What is claimed is:

1. A trailer mounted mobile apparatus for dewatering and recovering formation sand from an oil-sand-water mixture contained in a remotely located field oil storage tank, said tank having a flanged fluid drain hole located at the bottom thereof, and a flanged fluid inlet hole located above said flanged fluid drain hole, said trailer mounted mobile apparatus towable by a truck, the trailer mounted mobile apparatus comprising:
    a. a furcated conduit adapted for connection to said tank flanged fluid drain hole, said furcated conduit having a first branch and a second branch, wherein said first branch comprises a first flanged end and a second flanged end, and wherein said second branch has a first end and a flanged second end;
    b. a high pressure water injection pipe for injecting high pressure water into said formation sand within the tank thereby forming a sluffy, said pipe insertable through said first branch of the furcated conduit and into the formation sand;
    c. means for withdrawing said slurry from the tank by way of said second branch of the furcated conduit;
    d. means for injecting treatment chemicals into the sluffy comprising an injection port and an injection conduit located on the second branch of the furcated conduit;
    e. means for dewatering the slurry said dewatering means located remote from the tank;
    f. means for transporting the slurry from the tank to the remote slurry dewatering means;
    g. means for recycling water separated from the slurry back into the tank for later collection and treatment;
    h. oil skimming means for recycling oil floating on the surface of the sluffy within the remote sluffy dewatering means back into the tank; and,
    i. forcing means for forcibly inserting said pipe into the formation sand; wherein said forcing means comprises:
        1. a rectangular frame removeably mounted by mounting means to said second flanged end of the first branch of the furcated conduit, said rectangular frame comprising:
            i. a first channel-shaped half frame having a first back member, a first side member and a second side member;

ii. a second channel-shaped half frame having a first back member, a first side member and a second side member;
2. a first protruding member fixed to the outside surface of the second side member of the second half-frame, wherein said first protruding member is perpendicular to the second side member of the second half frame, and wherein the first protruding member includes a first threaded aperture having an axis parallel to the second side member of the second-half frame and further wherein said axis intersects the first back member of the first half frame at a point adjacent to the intersection of the first half-frame first back member and first side member;
3. a second protruding member fixed to the outside surface of the second side member of the first-half frame, wherein said second protruding member is perpendicular to the second side member of the first half frame, and wherein the second protruding member includes a second threaded aperture having an axis parallel to the first side member of the second half-frame and further wherein said axis intersects the first back member of the second half-frame at a point adjacent to the intersection of the second half frame first back member and first side member;
4. a third threaded aperture located where the axis of the first threaded aperture intersects the first half-frame first back member, said third threaded aperture having a thread and diameter identical to the first threaded aperture;
5. a forth threaded aperture located where the axis of the second threaded aperture intersects the second half frame first back member, said forth threaded aperture having a thread and diameter identical to the second threaded aperture;
6. a first threaded rod having a length at least equal to the length of the first half frame first side member, said first threaded rod having a first end threadably engaged with the third aperture, the first threaded rod having a second end threadably engaged with the first aperture, so that when the first threaded rod is turned in a clock-wise direction the first back members of the first and second half-frames are drawn together and when the first threaded rod is turned in a counter-clockwise direction the first back members of the first and second half frames are moved apart;
7. a second threaded rod having a length at least equal to the length of the second half-frame first side member, said second threaded rod having a first end threadably engaged with the forth aperture, the second threaded rod having a second end threadably engaged with the second aperture, so that when the second threaded rod is turned in a clock-wise direction the first back members of the first and second half frames are drawn together and when the second threaded rod is turned in a counter-clockwise direction the first back members of the first and second half frames are moved apart;
8. a first handle fixed to the first end of the first threaded rod for turning the first threaded rod; and,
9. a second handle fixed to the first end of the second threaded rod for turning the second threaded rod.

2. The apparatus of claim 1 wherein said first channel-shaped half-frame and said second channel-shaped half frame have identical proportions, and further wherein the second channel-shaped-half frame is positioned opposite the first channel-shaped half frame so that their respective open ends facing each other and further wherein the second channel-shaped half-frame is positioned partially within the first channel-shaped half-frame in a sliding alignment so that the first side member of the first channel-shaped half frame is adjacent to and parallel to the second side member of the second channel-shaped half frame and wherein the second side member of the first channel-shaped half frame is adjacent and parallel to the first side member of the second channel-shaped half frame, and further wherein each of the first and second side members of each of the first and second channel-shaped half-frames have inside and outside surfaces.

3. The apparatus as claimed in claim 2 wherein the forcing means further comprises:
   a. a first drive wheel mounted on an axle, said axle positioned within the first half frame, said first drive wheel positionally fixed with respect to the first half-frame and moveable with the first half frame, wherein the first drive wheel includes an engagement surface and is adapted to move into frictional engagement with the pipe;
   b. a second drive wheel mounted on an axle, said axle positioned within the second half-frame, said second drive wheel positionally fixed with respect to the second half-frame and moveable with the second half-frame, wherein the second drive wheel includes an engagement surface and is adapted to move into frictional engagement with the pipe at a position which is opposite the place of frictional engagement of the first drive wheel with the pipe; and,
   c. a plurality of drive gears mounted to the frame, said drive gears adapted to drive in a forward and reverse direction, a drive chain, said drive chain connecting each of the drive wheels to a motor so that each of the drive wheels counter-rotate and wherein each of the drive wheel frictional engagement surfaces are in frictional contact with the pipe and act to provide a motive force to the pipe thereby pushing it into the formation sand within the tank.

4. The apparatus as claimed in claim 3 wherein said motor is hydraulically powered and wherein said hydraulic power is generated remotely from said truck.

5. The apparatus as claimed in claim 4 wherein the frictional engagement surfaces of each drive wheel are fabricated from a heat resistant polymer.

6. The apparatus as claimed in claim 1 wherein said means for withdrawing the sluffy from the tank by way of the second branch of the furcated conduit comprises:
   a. the annulus within the first branch of the furcated conduit wherein said annulus permits the flow of sluffy from the tank and discharge from said second branch flanged second end;
   b. a screen chamber having an inlet end and a discharge end said screen chamber attached to the second branch second flanged end wherein the screen chamber is adapted to trap debris within the sluffy that is not suited for pumping;
   c. a suction creation means mounted within a housing said housing having an inlet and a discharge end wherein the housing inlet is attached to the discharge end of the screen chamber, and wherein said suction creation means is adapted to create a suction across the pump housing in order to promote the removal of slurry from the tank; and,
   d. a reduction nozzle having an inlet and a discharge end, wherein said inlet of said reduction nozzle is attached to said discharge of the housing, and wherein the reduction nozzle is adapted to accelerate the flow of slurry into an adjacent reduction nozzle discharge conduit having an inlet and a discharge end, said inlet attached to the discharge end of the reduction nozzle.

7. The apparatus as claimed in claim 6 wherein the suction creation means comprises a disc mounted within the housing, wherein said disc has an upstream face and a down stream face, and wherein the disc is apertured at its centre to permit the flow of slurry there through, and further wherein the disc further includes a plurality of water discharge ports positioned on said downstream face, and further wherein each of said plurality of water discharge ports are in communication with a source of high pressure water, and further wherein said source of high pressure water is directed to the plurality of water discharge ports by a plurality of channels located within the disc, said plurality of channels connected to a source of high pressure water.

8. The apparatus of claim 7 further comprising means for injecting low pressure water into the tank so that the slurry maintains an adequate water content for pumping, said means for injecting low pressure water comprising:
   a. a reservoir of water;
   b. a second pump having a suction intake connected to said reservoir of water by a intake conduit, said second pump having a discharge connected to the tank by a discharge conduit wherein the discharge conduit has a discharge end and further wherein said discharge conduit discharge end is connected to the flanged fluid inlet hole of the tank and further wherein the discharge pressure of the second pump is less than the discharge pressure of the first pump while maintaining an adequate flow of low pressure water to the tank to maintain a desired slurry consistency; and,
   c. a control valve mounted on the discharge conduit to control fluid flow into the flanged fluid inlet hole of the tank.

9. The apparatus as claimed in claim 1 wherein said remote slurry dewatering means comprises a trailer mounted rectangular container comprising:
   a. a volume sufficient to contain the sluffy pumped from the field storage tank, said container having an open top for receiving slurry through said third pump discharge conduit, wherein an oil/water interface forms on top of the slurry;
   b. a rear gate having a first closed position for receiving slurry and a second open position for discharging dewatered formation sand, wherein in said first closed position said rear gate is leak free;
   c. a bottom surface having bottom surface sluffy dewatering means;
   d. a first side wall having a top edge and a bottom edge and having a first side wall slurry dewatering means;
   e. a second side wall having a top edge and a bottom edge and having a second side wall slurry dewatering means;
   f. a front wall having front wall sluffy dewatering means; and,
   g. a sump located above said bottom surface for collecting water separated from the slurry,
   wherein the container is inclinable by a hydraulic lift so that dewatered sand may be discharged from the rear gate by gravity.

10. The apparatus as claimed in claim 9 wherein said bottom surface sluffy dewatering means comprises:
    a. a first plurality of rectangular filter strips, said first plurality of rectangular filter strips having, in relation to the trailer, a foreword edge located proximate to said front wall, a rearward edge located proximate to the rear gate, a first side edge and a second side edge wherein said first and second side edges are parallel to said first and second side walls, and wherein the plurality of rectangular filter strips are mounted parallel to each other and have a length substantially equal to the length of the first and second side walls, and further wherein the plurality of rectangular filter strips are mounted above the bottom surface on a plurality of raised mounts having a top end and bottom end, said plurality of raised mounts in turn attached to the to the bottom surface by their bottom ends and attached to the plurality of rectangular filter strips by their top ends, so that the plurality of rectangular filters rest above the bottom surface and so that a cavity is formed between the plurality of rectangular filters and the bottom surfaces, and wherein each of the plurality of rectangular filter strips comprising the plurality of rectangular filter strips is mounted in a parallel spaced apart relationship; and wherein each rectangular filter strip of the plurality of rectangular filter strips comprises:
       i. a first layer comprising a mesh having a coarse grid adapted to screen debris and breaking up lumps of slurry;
       ii. a second layer comprising a mesh having a fine grid adapted to separate water from formation sand in the slurry; and,
       iii. a third layer comprising a coarse grid mesh adapted to provide support to the said first and second layers
    b. a plurality of impervious metallic rectangular strips wherein each impervious metallic rectangular strip comprising the plurality of impervious rectangular metallic strips is placed between two adjacent spaced apart rectangular filter strips, and wherein each of the metallic rectangular strips is fixed to the bottom surface by way of a single mount having a top end and a bottom end and a height slightly higher than the adjacent rectangular filter strips, and wherein each of the plurality of impervious metallic rectangular strips have a width sufficiently wide to slightly overlap the adjacent rectangular filter strips, and wherein the single mounts are sufficiently sized to support the weight of slurry material above the impervious metallic rectangular strips and are adapted to prevent the adjacent rectangular filter strips from being crushed by the weight of slurry material above them;
    c. a first flow directing means mounted between the rectangular filter strip adjacent the first side wall slurry filtering means for directing downward flow adjacent to the first side wall onto said adjacent rectangular filter strip, wherein said first flow directing means is fabricated from metal and has a length equal to the length of the adjacent rectangular filter strip; and,
    d. a second flow directing means mounted between the rectangular filter strip adjacent to the second side wall slurry filtering means for directing downward flow adjacent to the second side wall onto said adjacent rectangular filter strip adjacent to the first side wall filter, wherein said first flow directing means is fabricated from metal and has a length equal to the length of the adjacent rectangular filter strip.

11. The apparatus as claimed in claim 10 wherein said first side wall slurry dewatering means comprises:
    a. a first single rectangular filter strip having, in relation to the trailer, a foreword edge located proximate to said front wall, a rearward edge located proximate to the rear gate, a top edge and a bottom edge, wherein said top edge is located below the top edge of the first side wall top edge and wherein the said bottom edge is located above the first side wall bottom edge, and wherein the first single rectangular filter strip is mounted by mounting means to the first side wall in a spaced apart relationship creating a gap between the first side wall and the first single rectangular filter strip, and wherein the first single rectangular filter strip comprises:
   i. a first layer comprising a mesh having a coarse grid adapted to screen debris and breaking up lumps of slurry;
   ii. a second layer comprising a mesh having a fine grid adapted to separate water from formation sand in the slurry; and,
   iii. a third layer comprising a coarse grid mesh adapted to provide support to the said first and second layers; and,
b. a first single impervious metallic capping strip mounted on the top edge of the first rectangular filter strip adapted to prevent slurry from falling behind the first rectangular filter strip.

12. The apparatus as claimed in claim 11 wherein said second side wall slurry dewatering means comprises:
a. a second single rectangular filter strip having, in relation to the trailer, a foreword edge located proximate to said front wall, a rearward edge located proximate to the rear gate, a top edge and a bottom edge, wherein said top edge is located below the top edge of the second side wall top edge and wherein the said bottom edge is located above the second side wall bottom edge, and wherein the second single rectangular filter strip is mounted by mounting means to the second side wall in a spaced apart relationship creating a gap between the second side wall and the second single rectangular filter strip, wherein the second single rectangular filter strip comprises
   i. a first layer comprising a mesh having a coarse grid adapted to screen debris and breaking up lumps of slurry;
   ii. a second layer comprising a mesh having a fine grid adapted to separate water from formation sand in the slurry; and,
   iii. a third layer comprising a coarse grid mesh adapted to provide support to the said first and second layers; and,
b. a second single impervious metallic capping strip mounted on the top edge of the second rectangular filter strip adapted to prevent slurry from falling behind the second rectangular filter strip.

13. The apparatus as claimed in claim 12 wherein said front wall filtration means comprise a plurality of alternating rectangular filter strips and impervious metallic strips mounted to the front wall of the container.

* * * * *